(12) United States Patent
Flann

(10) Patent No.: US 11,056,996 B2
(45) Date of Patent: Jul. 6, 2021

(54) MECHANICAL SOLAR TRACKER FOR ENERGY AND SHADE

(71) Applicant: Nicholas Simon Flann, Smithfield, UT (US)

(72) Inventor: Nicholas Simon Flann, Smithfield, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 16/791,331

(22) Filed: Feb. 14, 2020

(65) Prior Publication Data

US 2020/0228053 A1 Jul. 16, 2020

Related U.S. Application Data

(63) Continuation-in-part of application No. 15/913,672, filed on Mar. 6, 2018, now Pat. No. 10,700,634.

(51) Int. Cl.
*H02S 20/32* (2014.01)
*F16H 25/14* (2006.01)
*F16H 53/06* (2006.01)

(52) U.S. Cl.
CPC ............ *H02S 20/32* (2014.12); *F16H 25/14* (2013.01); *F16H 53/06* (2013.01)

(58) Field of Classification Search
CPC ........... H02S 20/32; F16H 25/14; F16H 53/06
See application file for complete search history.

(56) References Cited

U.S. PATENT DOCUMENTS

| 4,195,905 A | 10/1980 | Hansen |
| 4,227,513 A | 10/1980 | Blake |
| 4,276,872 A | 7/1981 | Blake |
| 4,395,581 A | 7/1983 | Girard |
| 4,535,961 A | 8/1985 | Sobczak |
| 4,832,001 A | 5/1989 | Baer |

(Continued)

FOREIGN PATENT DOCUMENTS

| CN | 102563919 A | 7/2012 |
| DE | 4309259 A1 | 9/1994 |

OTHER PUBLICATIONS

Stoddard et al. Economic, Energy, and Environmental Benefits of Concentrating Solar Power in California. National Renewable Energy Laboratory. 2006.

(Continued)

*Primary Examiner* — Jayne L Mershon

(57) ABSTRACT

In embodiments, a mechanical solar tracker for energy and shade disclosed herein includes a positioning cam comprising one or more paths being configured as a function of a latitude location of the mechanical solar tracker; a sleeve coupled to an adjustment arm, the adjustment arm operable to rotate the sleeve about a vertical axis; a cam follower coupled to the sleeve, the cam follower configured to translate a selected path of the one or more paths as the sleeve rotates about the vertical axis, and a surface coupled to the cam follower. In embodiments, the selected path is configured such that as the sleeve rotates about the vertical axis, the cam follower maintains the surface normal to a vector defined by an azimuth angle and elevation angle, wherein the azimuth angle may be the sun azimuth angle and the elevation angle may be the sun elevation angle.

20 Claims, 13 Drawing Sheets

(56) References Cited

U.S. PATENT DOCUMENTS

| | | | |
|---|---|---|---|
| 5,622,078 | A | 4/1997 | Mattson |
| 6,128,135 | A | 10/2000 | Stiles |
| 6,485,152 | B2 | 11/2002 | Wood |
| 7,714,260 | B2 | 5/2010 | Carroll |
| 2009/0078248 | A1 | 3/2009 | Brown |
| 2009/0260619 | A1 | 10/2009 | Bailey |
| 2012/0042869 | A1 | 2/2012 | Wood |
| 2012/0158362 | A1 | 6/2012 | Vandevelde |
| 2012/0192917 | A1 | 8/2012 | Whitted |
| 2013/0021471 | A1 | 1/2013 | Waterhouse |
| 2013/0037082 | A1 | 2/2013 | Grant |
| 2013/0047977 | A1 | 2/2013 | Schmaelzle |
| 2013/0133719 | A1 | 5/2013 | Huang |
| 2013/0240018 | A1* | 9/2013 | Park .................. H02S 20/32 136/246 |
| 2014/0283894 | A1 | 9/2014 | Silver |
| 2015/0377519 | A1 | 12/2015 | Ryu |
| 2016/0268968 | A1* | 9/2016 | Demers ............... F24S 30/452 |

OTHER PUBLICATIONS

Array Technologies Inc. DuraTrack DA Specification. Albuquerque, NM. https://www.solaris-shop.com/content/DuraTrack%20DA%20Specifications.pdf.

Fathabai. Novel high efficient offline sensorless dual-axis solar tracker for using in photovoltaic systems and solar concentrators. Renewable Energy. Sep. 2016. pp. 485-594. vol. 95.

\* cited by examiner

MECHANICAL SOLAR TRACKER FOR ENERGY AND SHADE

CROSS-REFERENCE TO RELATED APPLICATIONS

This application is a continuation-in-part application to U.S. Non-provisional application Ser. No. 15/913,672, filed on Mar. 6, 2018 and entitled "Mechanical Solar Tracker," which is hereby incorporated by reference in its entirety.

TECHNICAL FIELD

The present disclosure relates to mechanical devices that may be easily adjusted to point towards the sun for the purposes of collecting solar energy or generating shade.

BACKGROUND

Solar trackers may be used to maximize solar collection onto a photovoltaic panel, to condense water, generate heat, or to perform other sun-related processes. They may also be used to create optimum shade conditions over a designated location.

SUMMARY

Providing shade from the sun can increase the safety and comfort of occupants of or objects located within an environment that would otherwise be exposed to sunlight. Because the sun moves across the sky throughout the day in different trajectories for each date of the year, keeping a particular area continuously shaded presents challenges. Namely, traditional umbrellas and other shading devices don't provide a means for tracking the sun's trajectory as it moves across the sky, and it can be difficult and tiresome to manually position such a device each time the sun's position changes.

The invention of the present disclosure satisfies the need for a reliable, low-cost, and mechanical solar tracker that is easy to adjust and will provide efficient collection of solar energy and optimal shade at a given location throughout the day. The present disclosure in aspects and embodiments addresses these various needs and problems.

The present disclosure covers apparatuses and associated methods for mechanical solar trackers. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" or "or" refer, for example, to instances in which a subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1:
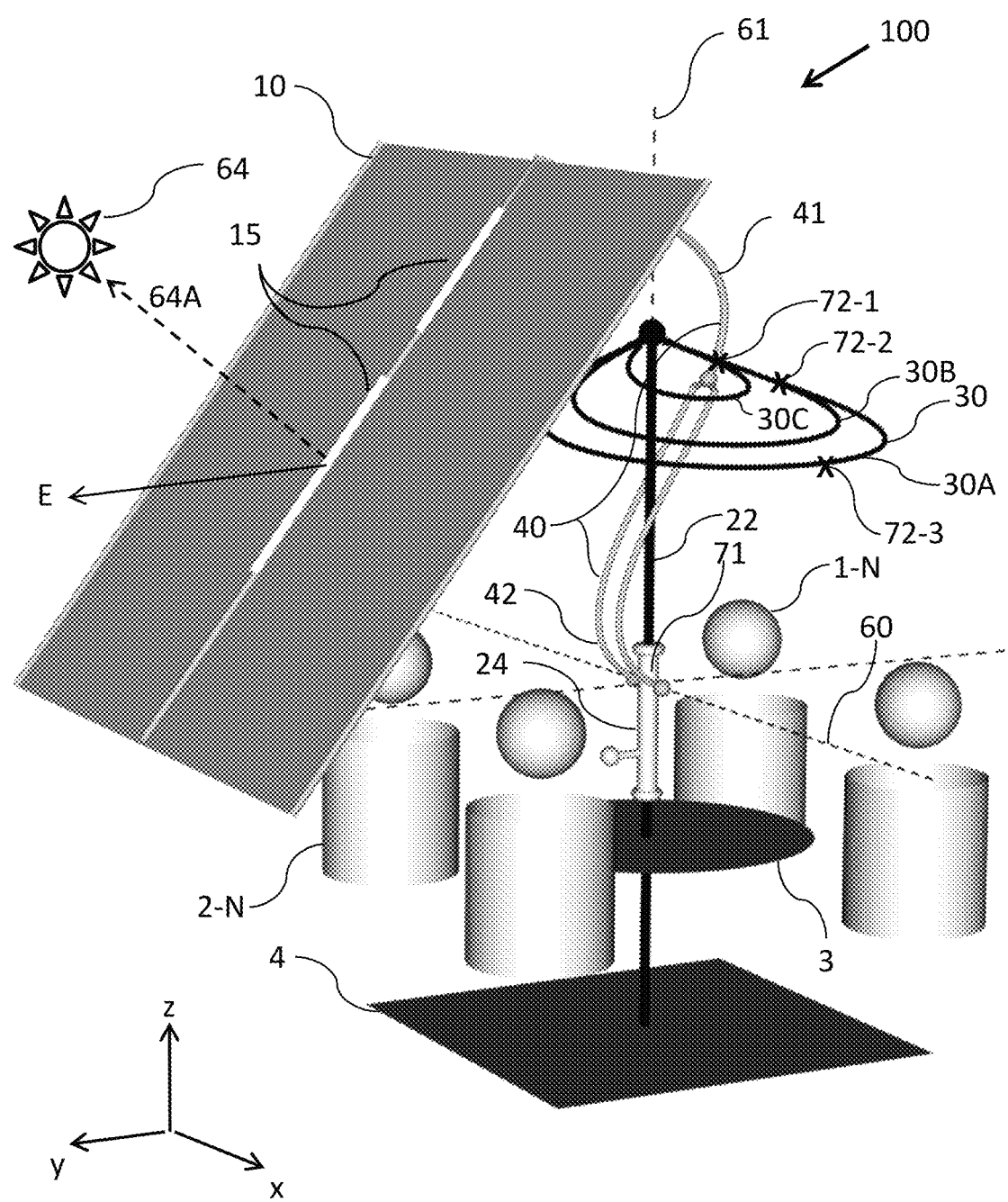
FIG. 1 illustrates an isometric view of an embodiment of a mechanical solar tracker proving.

For the purposes of this disclosure, the terms "collector", "shade", and "surface" may be used interchangeably and may refer to a photovoltaic panel collector, a reflector, a device for collecting solar radiation for conversion to heat or any solar-energy driven process, a material that may provide shade, or any combination of these materials. In other words, the term "surface" may be used to describe a device suitable for providing shade from the sun, collecting solar energy, or both. In accordance with the present disclosure, a surface may be shaped in whatever manner is best suited to the application. For example, the shape of surface may reflect the shape of an area to be shaded.

In accordance with the present disclosure, a surface designed to provide shade can be constructed out of one or more materials that are designed to protect from the sun, including, for example: nylon, canvas, acrylic, olefin, high density polyethylene fabric, or vinyl-coated polyester.

For the purposes of this disclosure, the term "translate" can be used to mean following or moving along a particular path.

For the purposes of this disclosure, the term "vertical axis" may be used to describe an imaginary (non-visible)

line that is perpendicular to the ground. One or more components of the mechanical solar tracker may rotate about such a line. The imaginary line may also serve as a fixed-reference line for the measurement of certain coordinates, as will be described herein.

For the purposes of this disclosure, the term "positioning cam" may be used to refer to any device comprising one or more "paths," which may also be referred to as "day paths" and are constructed based on the latitude location of the mechanical solar tracker. Such paths comprise the positioning cam's overall surface and shape. The paths may be tube-like or cylindrical in structure. Alternatively, they may be fashioned as guides cut from a sheet of material. They may be closed paths forming a closed shape. A positioning cam may include a component for coupling each of the paths together at a common point. A positioning cam may also include a means for attaching another device to one of the paths.

For purposes of this disclosure, a "latitude location" may be a range of latitude locations. For example, while a mechanical solar tracker may be designed for a specific latitude, e.g., Logan, Utah, USA, with a latitude of approximately 42 degrees, such a solar tracker may be used for latitudes ranging from 40 to 44 (+/−two-degrees latitude), 35 to 49 (+/−seven-degrees latitude), or 32 to 52 (+/−10-degrees latitude). However, the trade-off for a wider-range design is that a mechanical solar tracker will not track the sun's path as accurately as possible.

For the purposes of this disclosure, the term "sleeve" may refer to any component comprising an aperture with a circumference suitable for fitting the component around another component. The aperture shape may reflect the overall sleeve shape. It may also reflect the shape of component around which the sleeve is to be fitted. The component around which the sleeve is to be fitted may be, for example, a pole. A sleeve may be configured to rotate with respect to the other component, or it may be configured to remain stationary while the other component rotates with respect to it. A sleeve may be cylindrical in shape.

For the purposes of this disclosure, the term "cam follower" refers to any device that may be coupled to a surface and may be configured to translate a path of a positioning cam. A cam follower may include one or more upper portions that connect to surface and one or more lower portions that connect to a sleeve. A cam follower may be constructed out of a tube-like material. It may be curved; for example, it may have an "S" shape.

For the purposes of this disclosures, the terms "adjustment arm" and "rotation drive" may be used interchangeably to refer to any device suitable for rotating a sleeve about a vertical axis, either manually, mechanically, or electro-mechanically. For example, such a device may be a component extending horizontally from a sleeve with a handle to which a user may apply force in order to achieve rotation of the sleeve. Such a device may also be an electric rotator.

For the purposes of this disclosure, the term "bearing" may be used to describe any component that allows for motion between two other components. The motion may constitute, but is not limited to, sliding or rotating. Such a component may be configured to carry a load while in contact with and moving relative to another component. In accordance with the present disclosure, the load may be a cam follower. A bearing may be cylindrical or spherical in shape. The materials forming a bearing may include, but are not limited to, one or more of the following materials: metal, polymer, plastic, or fiber. A bearing, as referenced in this disclosure may, in some embodiments, be a tube or sleeve that allows relative motion between two other components, which may also be referred to as a bushing.

In various figures the cardinal directions in the fixed reference frame may be labeled as "N" for north, "S" for south, "E" for east, and "W" for west. The cardinal directions and Cartesian axes are provided in the figures to illustrate the orientation of the various mechanical solar trackers. The Cartesian axes may be labeled as "x", "y", and "z". For the purposes of the present disclosure, an axis running from north to south may be referred to as an "x-axis." An axis running from east to west may be referred to as a "y-axis". The term "x-y plane" may refer to an imaginary, two-dimensional surface that extends infinitely along and contains both the x-axis and y-axis. The "x-y" plane may also be referred to as a "horizontal plane." The z-axis is a vertical axis and may represent a third vector perpendicular to both the x-axis and the y-axis. A rotation about the z-axis in the x-y plane is referred to as an "azimuth" rotation and may be described by an azimuth angle. The term "z-r plane" may refer to an infinite, two-dimensional surface that extends infinitely along and contains the z-axis and an orthogonal imaginary axis r which lies along the x-y plane. The r-axis is independent of x and y and is invariant to azimuth rotation about vertical z-axis. A rotation in the z-r plane about the point where the z-r plane intersects the x-y plane is referred to as an "elevation" rotation and may be described by an elevation angle. The vector normal to the z-r plane originating at the point where the z-r plane intersects the x-y plane is referred to as the "elevation rotation axis." Elevation rotation is about the elevation rotation axis.

FIG. 1 illustrates a southwest-facing view of mechanical solar tracker 100 as a patio umbrella shading a patio table 3 seating a number of people 1-N, where N is equal to four people in FIG. 1. Each person is illustrated as a head 1, and an associated torso 2. For this particular illustration, the time is 08:00 AM on the 21st of June. The location is Utah State University in Logan, Utah, USA. In order to cast shade on patio table 3, the mechanical solar tracker 100 is configured to position surface 10 normal to the sun direction vector 64A extending from reference point 71 position on a vertical axis 61 to the sun 64. Surface 10 may be a photovoltaic panel collector, a reflector, a device for collecting solar radiation for conversion to heat or any solar-energy driven process, a material that may provide shade, or any combination of these materials.

In FIG. 1 and other figures, the sun direction vector 64A of the sun 64 in the sky is the vector that points from the reference point 71 to the sun 64 that may be defined by two angles. The first of these angles is the sun azimuth angle, $\psi_S$ (illustrated in FIGS. 8B and 9B), which may refer to the compass bearing, relative to the true (geographic) south of a point on the horizon directly beneath the sun 64. The second angle is the sun elevation angle $\alpha_S$ (illustrated in FIG. 4A), the angle measurement between the sun direction vector 64A and a vector extending from reference point 71 to the point on the horizon directly below the sun 64 (illustrated in FIGS. 4A, 8A and 9A). The "horizon" may refer to a horizontal ("x-y") plane that contains reference point 71 as well as the point directly below the sun 64.

Referring again to FIG. 1, embodiments of the present disclosure may include, but are not limited to, a mechanical solar tracker 100 comprising a positioning cam 30, a sleeve 24, a cam follower 40, and a surface 10 coupled to cam follower 40. The positioning cam 30 may comprise one or more day paths, e.g., 30A, 30B, 30C (or additional day paths), the one or more paths being configured as a function of latitude location of the mechanical solar tracker 100. The sleeve 24 may be coupled to an adjustment arm 25 (shown in FIGS. 2, 3, and 4B), the adjustment arm 25 operable to rotate the sleeve 24 about a vertical axis 61. Cam follower 40 may be coupled to the sleeve 24 and configured to translate a selected path (in FIG. 1, the selected path is illustrated as day path 30A) of the one or more day paths 30A, 30B, 30C as the sleeve 24 rotates about vertical axis 61. In some embodiments, the selected path may be configured such that as the sleeve 24 rotates about vertical axis 61, upper-cam follower 41 maintains surface 10 normal to a vector extending from reference point 71 through surface 10 to the sun 64, illustrated in FIG. 1 and other figures as sun direction vector 64A. As sleeve 24 is rotated about vertical axis 61, cam follower 40 traces along day path 30A, which tips surface 10 by an elevation rotation to follow the position of the sun 64 as the sun 64 moves across the sky over a period of time.

Other embodiments of the present disclosure may include a mechanical solar tracker 100 comprising a positioning cam 30, a sleeve 24, a cam follower 40, and a surface 10 coupled to cam follower 40. The selected path may be configured such that as the sleeve 24 rotates about vertical axis 61, cam follower 40 optimizes the amount of solar energy collected by surface 10 by tracing the selected path (in FIG. 1, the selected day path is illustrated as 30A) as the sun 64 moves across the sky over a period of time.

Embodiments of the present disclosure may also include methods of constructing a positioning cam 30. Such methods may include determining one or more sets of contact points 72-N (e.g., 72-1, 72-2, 72-3, etc.), as a function of a position of the sun 64 relative to a reference point 71 central to a given area 3 (illustrated as a patio table 3 in FIG. 1), wherein each set of contact points 72-N of the one or more sets of points (one for each day path 30A, 30B or 30C for example) is determined based on a specified day of a year and on a latitude location of reference point 71, each point within each set of points of the one or more sets of points is determined based on a specified time of the specified day of the year. Such methods may also comprise constructing one or more paths that comprise the positioning cam 30, wherein each day path 30A, 30B, or 30C, of the one or more paths comprising positioning cam 30 includes one set of points of the one or more sets of points; selecting a first day path 30A of the one or more paths; and causing a cam follower 40 to trace the selected day path 30A. The selected day path 30A may be configured such that as cam follower 40 traces the selected day path 30A, cam follower 40 maintains surface 10 (which is coupled to cam follower 40) normal to the sun direction vector 64A extending from the sun 64 to reference point 71 as the sun 64 moves across the sky during the specified day of the year. The selected day path 30A may also be configured such that as cam follower 40 traces the selected day path 30A, cam follower 40 optimizes the amount of solar energy collected or shade provided or both by a surface 10 coupled to cam follower 40.

Figure 2:
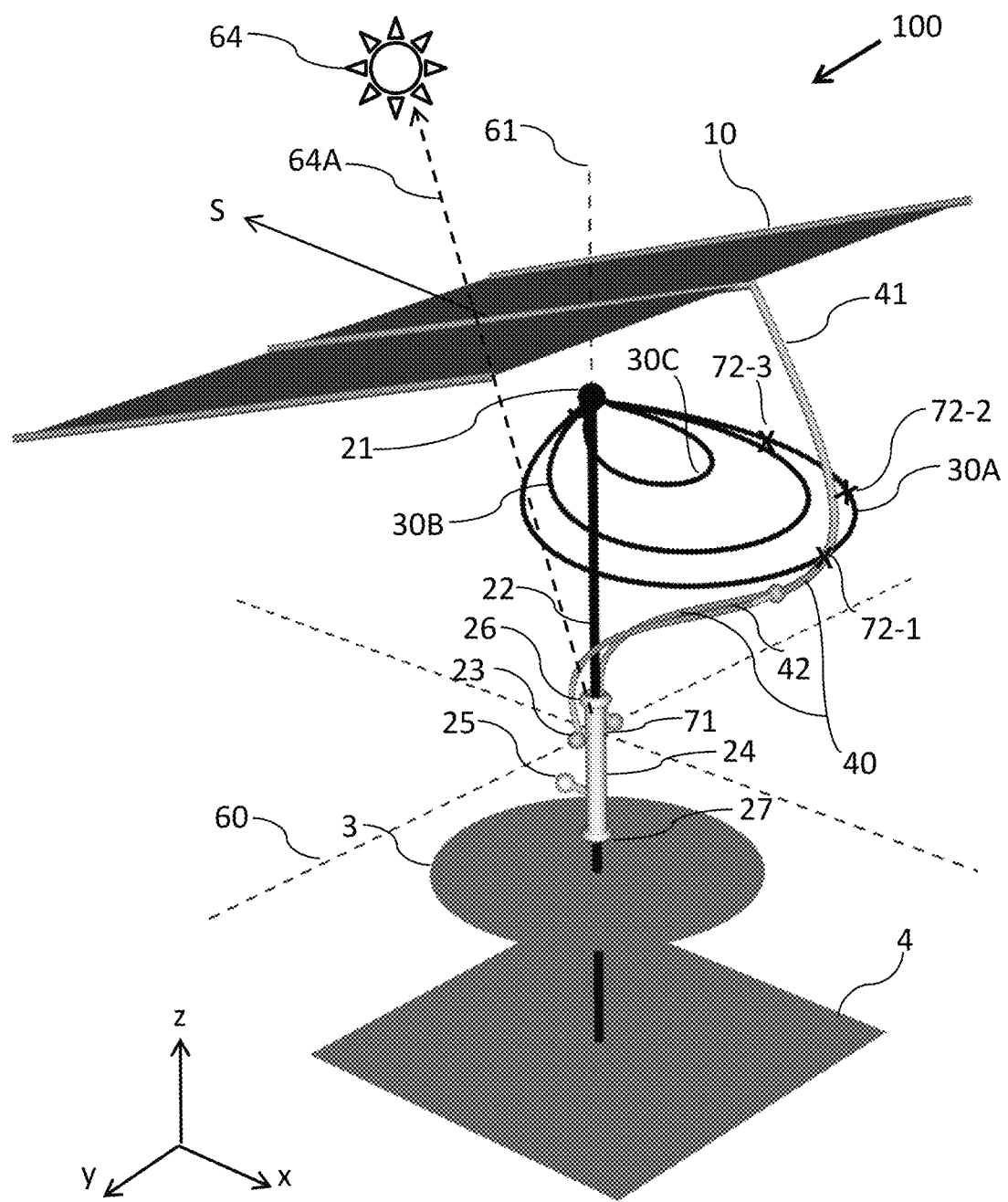
FIG. 2 is another isometric view of the mechanical solar tracker.

As illustrated in FIGS. 1 and 2, in some embodiments, mechanical solar tracker 100 may include a central pole 22 that connects to a positioning cam 30. Central pole 22 may be aligned with vertical axis 61. It may secure surface 10 to a foundation 4, which may be the ground, the roof of a building, the deck of a ship, or any other structure that provides a fixed attachment from below. Central pole 22 may also be supported from above, such as by an arm connected to a pole that is horizontally offset from vertical axis 61 as part of a pavilion, pergola, cantilever umbrella, or any other structure that provides a fixed attachment point from above. Supports from above and below central pole 22 may be deployed separately or together.

Surface 10 may be configured to cast shade onto the area below the positioning cam 30 based on the shape of surface 10. Surface 10 may be configured to cast a shade on the opposite side of surface 10 to which the sun 64 is casting light along the sun direction vector 64A. Surface 10 may be shaped to provide constant shade to a specific area or object based on the application. In FIG. 1, surface 10 is shaped to provide constant shade for all days of the year to the tops of the human torsos 2-N and their heads 1-N when the surface 10 is adjusted to face the sun 64 as it moves across the sky. The shape of surface 10 may also be designed to provide partial shade for a larger area based on the time of day and date of the year. This area may contain a patio table 3, human heads 1-N and human torsos 2-N, or any other object that benefits from shade, such as equipment, crops, animals, or dwellings. Surface 10 may also be shaped to collect solar energy from the sun 64.

FIG. 2 illustrates another isometric, southwest-facing view of a mechanical solar tracker 100 as a patio umbrella embodiment shading a patio table 3 at 12:30 on the $21^{st}$ of June at Utah State University. Fixed or non-moving elements of this embodiment may include central pole 22, which may be connected at its lower end to foundation 4 (which may be the ground) and attached at its upper end to a connecting structure 21. The connecting structure 21 may connect to the positioning cam 30. In this embodiment, cam follower 40 may translate one of three day paths 30A, 30B or 30C, the designs of which are described herein. Central pole 22 may be fixed to the foundation 4 and pass through a patio table 3.

In some embodiments, cam follower 40 may be a support assembly comprised of an upper-cam follower 41 and a lower-cam follower 42. Upper-cam follower 41 may be coupled to surface 10. For example, upper-cam follower 41 of cam follower 40 may be fixed to the back of surface 10. Upper-cam follower 41 may also be coupled to a lower-cam follower 42 to form a continuous cam follower 40.

Lower-cam follower 42 may be coupled to a sleeve 24. The sleeve 24 may be concentric to central pole 22 and may freely rotate around vertical axis 61 implementing an azimuth rotation. In such an embodiment, central pole 22 may be aligned with vertical axis 61 and may secure the positioning cam 30 to a foundation 4. Lower-cam follower 42 may be configured to allow central pole 22 to pass through it. For example, lower-cam follower 42 may be split into two parallel, curved-rod structures, providing a means for central pole 22 to pass between cam follower 40 as cam follower 40 changes positions. The two rods of lower-cam follower 42 may connect to the sleeve 24 rotationally in elevation rotation axis 60.

Two or more bushings 23 (illustrated in FIG. 2) may be connected to the bottom of the lower-cam follower 42. The bushings 23 may each encircle one of two pins that protrude from the sleeve 24. The bushings 23 may rotationally attach surface 10 and cam follower 40, to the pins about an elevation rotation axis 60. The pins, being fixed to the sleeve 24, may enable rotation of surface 10 and cam follower 40 about the vertical axis 61, as sleeve 24 rotates about central pole 22.

Referring again to FIG. 2, surface 10 may be attached to a cam follower 40, or upper-cam follower 41 such that it may rotate about an axis, such as elevation rotation axis 60 as well as vertical axis 61. In FIG. 2, the mechanical sun tracker 100 is depicted at 12:30 on the $21^{st}$ of June with surface 10 facing south. In FIG. 1, the mechanical sun tracker 100 is depicted at 08:00 AM on the 21st of June with surface 10 facing east. The azimuth rotation needed to transition surface 10 from facing east in FIG. 1 and facing south in FIG. 2 may be implemented by rotation of sleeve 24 about central pole 22. Surface 10 also rotates about elevation rotation axis 60 during the transition of mechanical solar tracker 100 from the orientation illustrated in FIG. 1 to the orientation illustrated in FIG. 2. This elevation rotation about elevation rotation axis 60 may be implemented by bushings 23 (illustrated in FIG. 2) rotating about the fixed pins protruding from sleeve 24.

FIG. 2 also illustrates positioning cam 30. The positioning cam 30 may be comprised of fixed day paths 30A, 30B or 30C that dictate the elevation angle of surface 10 based on the elevation angle of upper-cam follower 41 as it rests at contact point 72-1. Each day path 30A, 30B, or 30C, may be defined as an array or a list of potential contact points 72-N that are defined in terms of x, y, and z coordinates in the fixed reference frame of mechanical solar tracker 100. The contact points 72-N may be defined as a function of a sun azimuth angle $\psi_S$ and a sun elevation angle $\alpha_S$.

Each day path 30A, 30B, or 30C may comprise a number of potential contact points 72-N. Although three potential contact points 72-1, 72-2, and 72-3 are identified in FIGS. 1 and 2, each day path 30A, 30B, or 30C may be comprised of any number of potential contact points 72-N. Each day path 30A, 30B, or 30C may be constructed by first determining a number of potential contact points 72-N and then forming a loop running through each of the contact points 72-N. Each of the potential contact points 72-N may be determined such that as upper-cam follower 41 rests at a contact point 72-1 on a selected day path 30A comprised potential contact points 72-N, surface 10 is positioned in a configuration that maximizes solar energy collection, shade, or both.

The day paths 30A, 30B, or 30C may be configured such that as the sleeve 24 rotates about vertical axis 61, cam follower 40 maintains surface 10 normal to sun direction vector 64A by tracing a selected day path out of the day paths 30A, 30B, or 30C. The day paths 30A, 30B, or 30C may also be configured such that as the sleeve 24 rotates about vertical axis 61, cam follower 40 optimizes solar energy collected by surface 10 (which may be a collector) by tracing the selected path of the day paths 30A, 30B, or 30C as sun 64 moves across the sky over a period of time. Maximizing solar energy collection, shade, or both, may require cam follower 40 to hold surface 10 at an elevation angle such that surface 10 is normal to sun direction vector 64A.

The contact points 72-N of the selected day path 30A are traversed as cam follower 40 rotates about vertical axis 61 of mechanical solar tracker 100. In this way, a change in sun azimuth angle $\psi_S$ of cam follower 40 (illustrated in FIG. 4B) changes the elevation angle of surface 10 as it rotates about vertical axis 61 at reference point 71, which is the center of both the azimuth and elevation rotation. The day paths 30A, 30B, or 30C may be customized to the latitude of the deployment location of mechanical solar tracker 100 and the day of the year. Described differently, in some embodiments, a positioning cam, such as positioning cam 30, may be configured based on the latitude location of the mechanical solar tracker 100 to provide control of the elevation angle of surface 10 necessary to track the sun elevation angle $\alpha_S$ during daylight hours. The positioning cam 30, through contact with upper-cam follower 41, may change the elevation angle of surface 10 so that surface 10 is held at an optimal (or near-optimal) elevation angle when adjusted to the correct azimuth angle. The optimal elevation angle may be determined based on a day of the year used to generate the day path 30N and the latitude at which mechanical solar tracker 100 will be deployed.

The azimuth angle at which surface 10 is positioned may be adjusted through rotation of the sleeve 24 about central pole 22. The sleeve 24 may be connected to lower-cam follower 42 through attached pins that lie within the bushings 23. The sleeve 24 may be coupled to central pole 22 by means of one or more swiveling members, such as upper and lower swivel bearings or members 26 and 27, which may allow the sleeve 24 to freely rotate about the vertical axis 61 and about central pole 22. The two swivel bearings or members 26 and 27 may support the weight of surface 10 and cam follower 40, and any additional components of surface support structure 48 (illustrated in FIG. 3).

Figure 3:
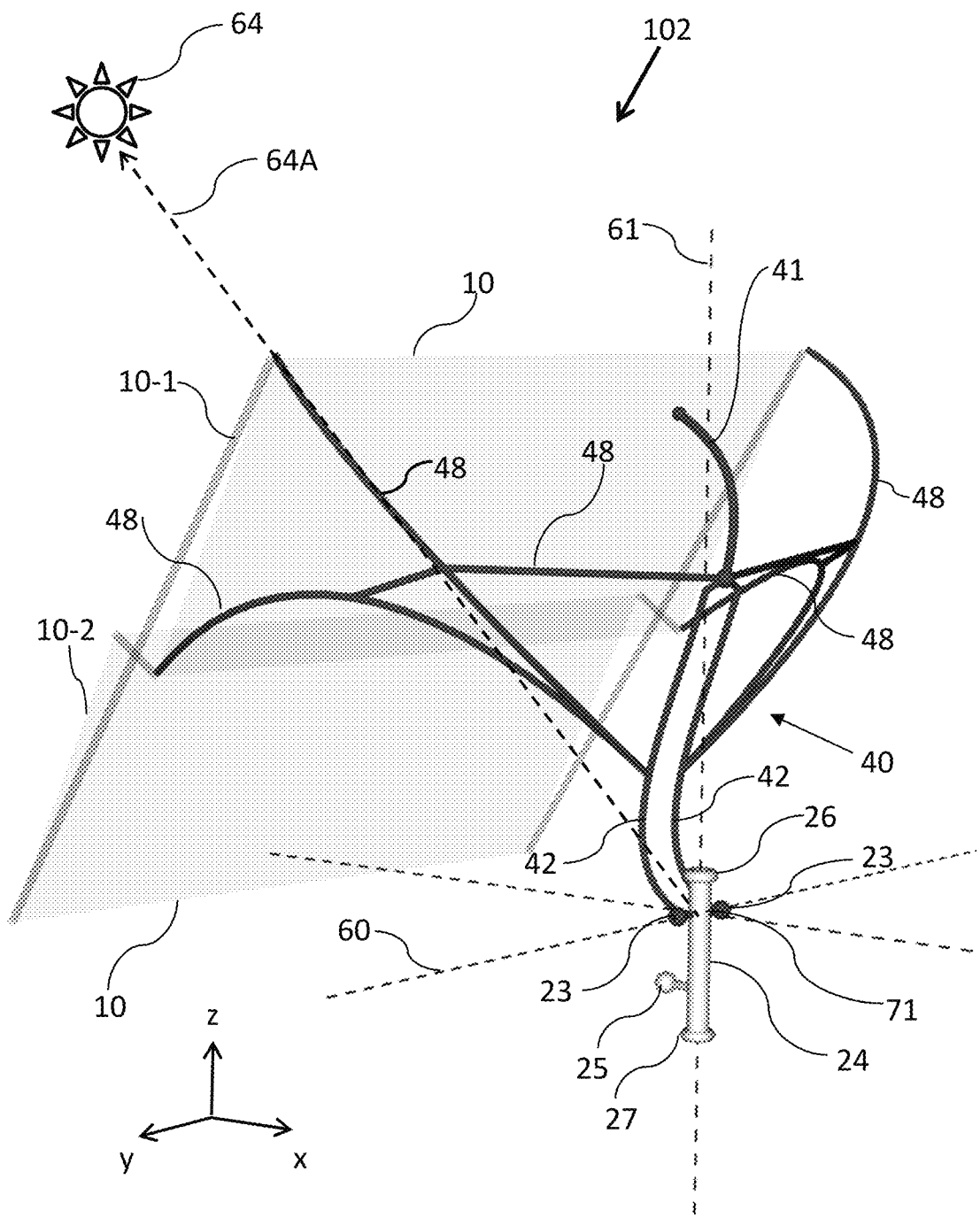
FIG. 3 is an isometric view of another mechanical solar tracker.

Referring to FIGS. 2 and 3, an adjustment arm 25 may be coupled to the sleeve 24 and may be operable to rotate the sleeve 24 about vertical axis 61. The adjustment arm 25 may be a mechanical or electrical rotation device. Rotating the sleeve 24 about vertical axis 61 through the adjustment arm 25 may cause cam follower 40 to trace the selected day path 30A of the one or more day paths 30A, 30B, or 30C. Azimuth rotation of surface 10 may also be achieved by the direct movement of any part of cam follower 40 or surface 10, or any additional components of surface support structure 48 (illustrated in FIG. 3). The mechanical solar tracker 100 or 102 may be configured such that rotation of sleeve 24 will cause cam follower 40 to travel on the upper and lower swivel bearings or members 26 and 27 circumferentially around the vertical axis 61.

Alternative to mechanical adjustment, an electro-mechanical actuation may be employed through a motor installed in sleeve 24 or central pole 22. An electro-mechanical actuator (positioned in sleeve 24) may automatically position the azimuth angle of surface 10 such that surface 10 is normal to the sun direction vector 64A.

Cam follower 40 and sleeve 24 may be configured to rotate circumferentially from east to west around vertical axis 61 during daylight, following the trajectory of the sun 64. Additionally, cam follower 40 and sleeve 24 may be configured to rotate circumferentially from west to east around vertical axis 61 during night-time. This may allow surface 10 to be positioned correctly when the sun 64 rises in the east again the next morning.

FIG. 3 illustrates an alternative embodiment of cam follower 40 and its attachment to surface 10 within mechanical solar tracker 102. For clarity, the positioning cam 30 is not illustrated in FIG. 3. However, the mechanical solar tracker 102 embodiment illustrated in FIG. 3 may include a positioning cam 30, as illustrated in FIGS. 1 and 2. The sun 64 and sun direction vector 64A are shown normal to surface 10. In this embodiment, cam follower 40 includes an additional support structure, surface support structure 48, which provides four attachment points between cam follower 40 and surface 10 in contrast to the single attachment point illustrated in FIGS. 1 and 2. In this embodiment, upper-cam follower 41 may not connect directly to surface 10. Azimuth rotation 61A actuation (illustrated in FIG. 4B) may be achieved through movement of surface support structure 48, which is attached to surface 10 and cam follower 40.

Surface 10 may be shaped circularly, rectangularly, or in any other fashion. The shape of surface 10 may be determined by aesthetic and engineering considerations. For example, surface 10 may be shaped in a manner that optimizes the solar radiation collected by surface 10. Surface 10 may also have a shape that matches a shape of an area that is to be shaded.

Surface 10 may also be broken up into multiple surfaces, as illustrated in FIG. 3. For example, surface 10 may be comprised of two distinct surfaces 10-1 and 10-2 that are mechanically coupled to move together. In this embodiment, surface 10 is broken into two individual surface elements 10-1 and 10-2 that are offset translationally along sun direction vector 64A. The shade coverage and/or solar energy collection of the single surface 10 may be unaffected by the breaking of surface 10 when the area that would be covered by the single surface 10 can be covered by an assembly of smaller elements 10-N when each element is offset along the sun direction vector 64A. Breaking surface 10 into one or more surface elements 10-N may lower resistance to wind and other disturbances and facilitate the disassembly and storage of surface 10. Splitting surface 10 also facilitates the integration of existing surface elements, into a larger surface assembly 10-N. Existing surface elements 10-1 and 10-2 may be solar panels or existing shade components that are available only as a selection from a fixed set of dimensions.

Figure 4A:
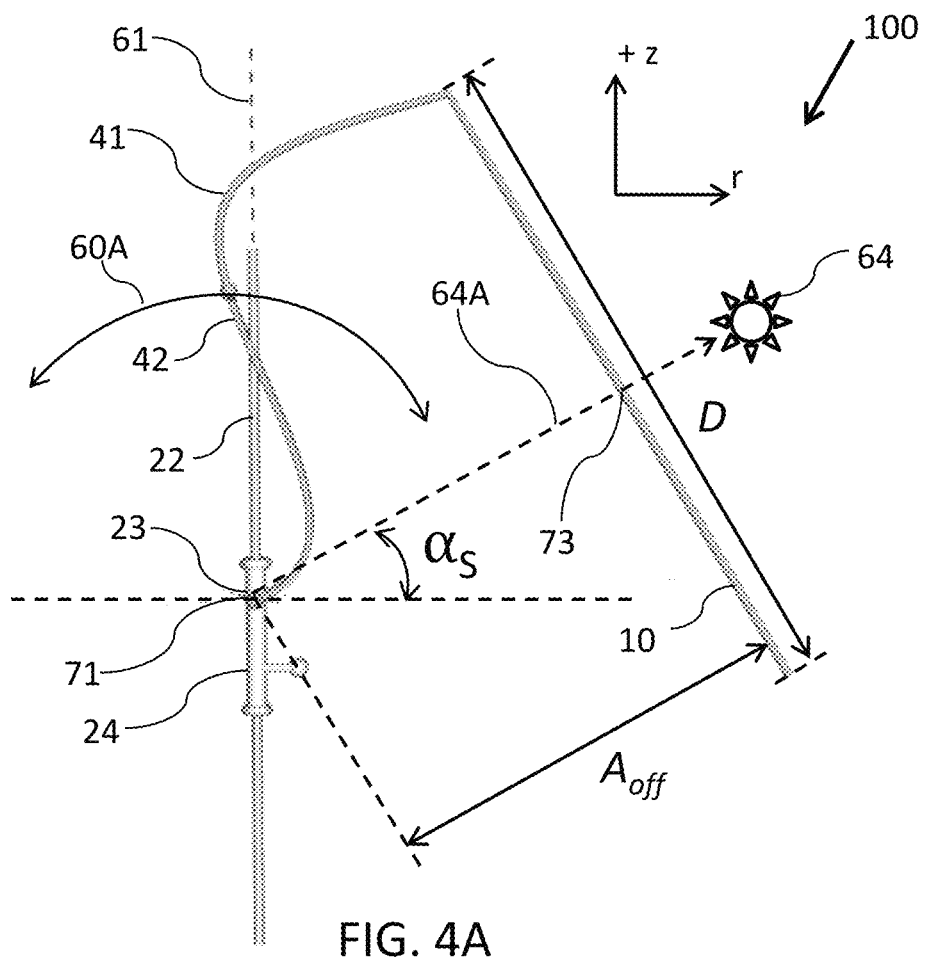
FIGS. 4A and 4B illustrate design parameters of a mechanical solar tracker.

FIG. 4A illustrates a side view of a mechanical solar tracker 100 at 19:30 on the summer solstice at Utah State University in Logan Utah, USA. Mechanical solar tracker 100 has a simplified upper-cam follower 41, which comprises of a single bent rod or tube, as illustrated in FIG. 1. FIG. 4A is a side view and is independent of azimuth rotation 61A about vertical axis 61 and is therefore placed within the z-r frame, where z is the vertical dimension and r is the radial distance from vertical axis 61. In this embodiment, surface 10 is configured to be positioned normal to the sun direction vector 64A given the current sun elevation angle $\alpha_S$.

As shown in FIG. 4A, cam follower 40 may be designed with a curved shape to minimize interference with a shaded area centered on reference point 71 as it rotates in elevation rotation 60A in the z-r plane. In some embodiments, cam follower 40 may be configured such that it minimally interferes with the shaded area. Other embodiments may present different interference constraints. The shaded area centered around and located about reference point 71 may contain any object or environment that would benefit from shade. In some embodiments, the shaded area may contain a patio table 3 and human heads 1-N, as illustrated in FIG. 1.

Figure 4B:
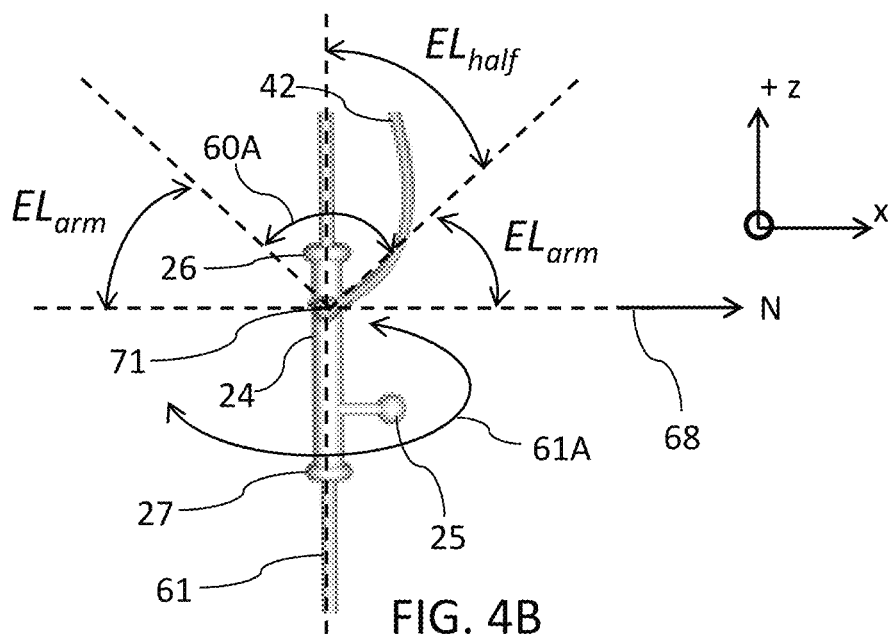

In FIG. 4B, shows a side-on view in the x-y-z plane with the north-south x-axis 68 and the vertical axis 61. The elevation angle of surface 10 is defined at the angle between the normal vector of surface 10 passing through reference point 71 and the horizontal line that passes through reference point 71 and may range from a minimum elevation $EL_{min}$ to a maximum elevation $EL_{max}$, defined by engineering constraints. Engineering constraints could define $EL_{max}$ as a 90-degree angle or $EL_{min}$ as a 0-degree angle, or these parameters could be limited by the dynamic range of the elevations of the sun 64 throughout a year at the deployment latitude, or could be any range.

In one embodiment, to minimize interference, lower-cam follower 42 may be configured such that the range of elevation rotation 60A required (defined as $EL_{max}-EL_{min}$) be bisected by vertical axis 61. For example, as illustrated in FIG. 4B, lower-cam follower 42 may stay within the region determined by $+EL_{half}$ to $-EL_{half}$ relative to vertical axis 61. The elevation angle $EL_{half}$ may be defined as $(EL_{max}-EL_{min})/2$ degrees. The elevation angle EL arm, illustrated in FIG. 4B, is defined as $90-EL_{half}$, and may determine the unobstructed area (or volume as lower-cam follower 42 rotates about vertical axis 61) above a horizontal plane to be shaded by mechanical solar tracker 100. To facilitate this rotational range and minimize interference, lower-cam follower 42 may be split about central pole 22, as illustrated in FIGS. 1 and 2, to allow lower-cam follower 42 to extend on each side of central pole 22. The specific shape of cam follower 40 may be chosen to minimize interference with a reference volume around vertical axis 61 and reference point 71.

As shown in FIG. 4A, surface 10 may be positioned normal to the sun direction vector 64A at an offset $A_{off}$ from reference point 71. $A_{off}$ represents the magnitude of the vector coincident with the sun direction vector 64A and extending from reference point 71 to surface intersect point 73, where sun direction vector 64A passes through surface 10. The bushings 23 may be located on either side of reference point 71. Given this configuration, as surface 10 rotates through an elevation angle range around reference point 71 in the z-r plane, the normal vector of surface 10 may maintain correspondence to the sun direction vector 64A. This elevation rotation may maintain a shadow that may be centered on reference point 71. The center of rotation at reference point 71 may be positioned above the center of a patio table 3, for example, as illustrated in FIG. 2. In some embodiments, the center of reference point 71 may be positioned at the estimated height of a human head 1 (shown in FIG. 1), either sitting or standing.

FIG. 4B shows a side-on view in the x-y-z plane with the north-south x-axis 68 and the vertical axis 61 illustrating the motion of solar tracker 100 in elevation rotation 60A and azimuth rotation 61A. The lower-cam follower 42 may rotate about vertical axis 61 implementing azimuth rotation 61A by means of two swivel bearings or members 26 and 27 that enable the sleeve 24 to freely rotate about central pole 22. Elevation rotation 60A about reference point 71 of lower-cam follower 42 is also illustrated.

Determining the Elevation Angle $\alpha_S$ and Azimuth Angle $\psi_S$ of the Sun Constructing a mechanical solar tracker 100 or 102 capable of tracking the current position of the sun 64 in the sky, or maintaining sun direction vector 64A normal to surface 10, requires determination of potential contact points 72-N. Contact points 72-N are calculated as a function of the position of the sun 64, the deployment latitude of the mechanical solar tracker 100 or 102, the date of the year, and the time of the day. Given the latitude location of the mechanical solar tracker, lat, the date of the year d, and the time of the day t, the position of the sun can be determined through algorithms. See Astronomical Algorithms, Jean H. Meeus, 1991. Online tools may also be used to determine the sun's position in terms of the sun azimuth angle $\psi_S$ and sun elevation angle $\alpha_S$. See www.sunearthtools.com. In some embodiments, the position of the sun 64 may be determined through software. See, for example, the Astral Python software provided through https://pythonhosted.org/astral/.

The position of the sun 64 may be defined as the function Sun:

$$<\psi_S, \alpha_S> \leftarrow \text{Sun}(\text{lat}, d, t),$$

where $\psi_S$ and $\alpha_S$ represent the sun azimuth angle and the sun elevation angle, respectively. The function above may be reduced to a look-up table that maps lat, d, and t to $\psi_S$ and $\alpha_S$. The date d may be sampled from all the dates of the year, with more dates producing a more accurate tracking of the sun. However, more dates also correspond to more mechanical adjustments during the year, because more dates correspond to more positioning cam paths. Each day path 30A, 30B, or 30C may constitute a set of contact points 72-N corresponding to positions of the sun relative to a central reference point such as reference point 71 illustrated in FIGS. 1, 2, and 3. Each point of each set of points may be determined such that when cam follower 40 is held at a contact point 72-N, surface 10 is maintained normal to the sun direction vector 64A. Each set of contact points 72-1, 72-2. 72-3, or 72-N, may be constructed based on the various positions of the sun with respect to a given latitude location of the mechanical solar tracker 100 or 102 throughout a unique date of the year. For example, in the embodiments illustrated herein (FIGS. 1, 2, 5A-F), five dates were selected to determine day paths 30A, 30B, and 30C. Day path 30A corresponds to the path of the sun 64 on March $20^{th}$ and September $21^{st}$, 30B corresponds to the path of the sun on May $4^{th}$ and August $7^{th}$, and 30C corresponds to the path of the sun on June $21^{st}$. In this example, March $20^{th}$ and September $21^{st}$ roughly represent an equal number of days from the solstice, or June $21^{st}$ Similarly, May $4^{th}$ and August $7^{th}$ roughly represent an equal number of days from the solstice.

Each day path 30A, 30B, and 30C constitutes a unique set of contact points 72-N that are determined based on the deployment latitude of the mechanical solar tracker 100 and positions traveled by sun 64 with respect to the mechanical solar tracker 100 throughout March $20^{th}$, May $4^{th}$, and June $21^{st}$, respectively. Although three paths are illustrated in FIG. 1, FIG. 2, and FIG. 5B, and two paths illustrated in FIG. 5A, the positioning cam may include any number of paths. The corresponding paths are illustrated in more detail in FIG. 5. Cam follower 40 may be positioned on a selected path of day paths 30A, 30B, or 30C. The selected path is configured such that as the cam follower follows the selected path, it maintains surface 10 normal to sun direction vector 64A extending from reference point 71 to sun 64 as sun 64 moves across the sky. In some embodiments, the selected path may be the path corresponding to the date that is closest to the current date. For example, if the current date is April $1^{st}$, path 30B may be chosen, since this path corresponds to date (March $20^{th}$) and is closest to April $1^{st}$. As the number of days that differ between the date for which that path was designed, for instance March $20^{th}$ and the date of operation, for instance April $1^{st}$, a discrepancy will increase between the normal vector from the surface 10 and sun direction vector 64A. In embodiments where a contiguous surface 10 is used, such as in FIG. 1 and FIG. 2, this discrepancy may result in a minor vertical offset in the shade provided to the patio table 3 or other shaded object.

Once the date is fixed, each day path 30A, 30B, and 30C is constructed by sampling t, which may be incremented in hours, minutes, or seconds. Each potential contact point 72-N corresponds to a unique time of day and represents a contact point between the selected day path 30A, 30B or 30C and follower 40. At this contact point surface 10 will be positioned such that sun direction vector 64A is normal to surface 10 at the corresponding time of day for the day path. It may be preferable to increment the time t in minutes, because the more precise the time measurement, the smoother day paths 30A, 30B, and 30C, and the more precise the elevation and azimuth angle of surface 10 may be. For example, if the time is incremented in minutes instead of hours, the day path will be smoother, a vector normal to surface 10 will be closer to sun direction vector 64A.

Designing the Mechanical Solar Tracker Cam Follower and Positioning Cam

Figure 5A:
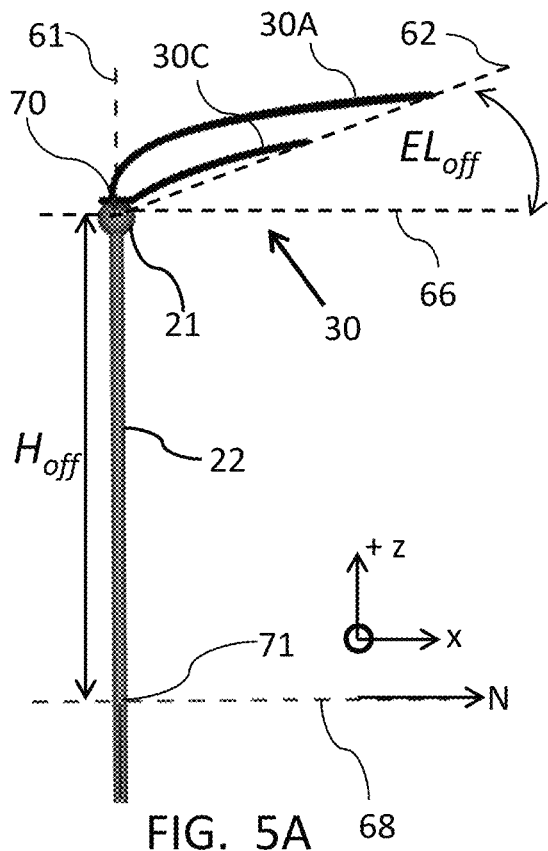
FIGS. 5A-5F illustrate various embodiments of a positioning cam of a mechanical solar tracker.
Figure 5B:
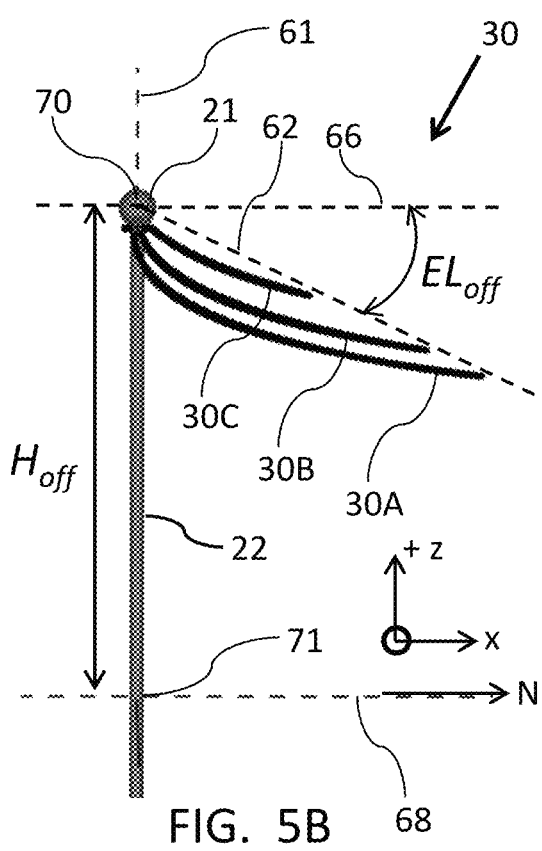

FIGS. 5A and 5B illustrate some of the design parameters of positioning cams 30 and 31, which form the inputs to the cam-design procedure that constructs a day path 30A, 30B, 30C, 31A, 31B, or 31C, or positioning cams 30 or 31, as described herein. In FIGS. 5A and 5B, the height $H_{off}$ represents the vertical distance between reference point 71 and cam center point 70 of the positioning cam 30. In both FIGS. 5A and 5B the day paths 30A, 30B, or 30C are viewed looking directly west. The other design parameter illustrated in FIGS. 5A and 5B is $EL_{off}$ that may be set by the designer to produce alternative embodiments to satisfy aesthetic constraints and engineering constraints such as mechanical interference. Cam design line 62 originates at cam center point 70 and is rotated at angle $EL_{off}$ about cam center point 70, relative to upper horizontal line 66. In FIG. 5A, $EL_{off}$ is set to positive 20 degrees forming an upward-sloping cam shape, while in FIG. 5B, $EL_{off}$ is set to negative 25 degrees, forming a downward-sloping cam shape. The choice of $EL_{off}$ to form cam design line 62 determines the shape of the positioning cam 30 and is set at design time. FIGS. 1 and 2 illustrate downward sloping designs resulting from negative $EL_{off}$ values.

To physically support a day path, additional structures, such as connecting structure 21, may connect the ends of each day path 30A, 30B and 30C to a point on central pole 22, as illustrated in FIGS. 2 and 5A-B. In some embodiments, connecting structure 21 may be located at the top of central pole 22.

The example day paths illustrated in FIG. 5A-5F are based on the latitude of Utah State University, Logan, Utah, USA, and the following dates: 30A=March $20^{th}$, 30B=May $4^{th}$ and 30C=June $21^{st}$. However, a positioning cam 30 in accordance with the present disclosure may include any latitude and any number of day paths, and the dates used to construct the day paths may be any dates throughout the year. The number of paths included on the positioning cam 30 and their corresponding dates may be selected based on the application. Three paths may require up to four adjustments over the year. For example, beginning in winter, cam follower 40 may follow day paths in the following order: 30A→30B→30C→30B→30A over the year. In this example, 30C would be used for both March $20^{th}$ and September $21^{st}$. Similarly, 30B would be used for both May $4^{th}$ and August $7^{th}$.

Figure 5C:
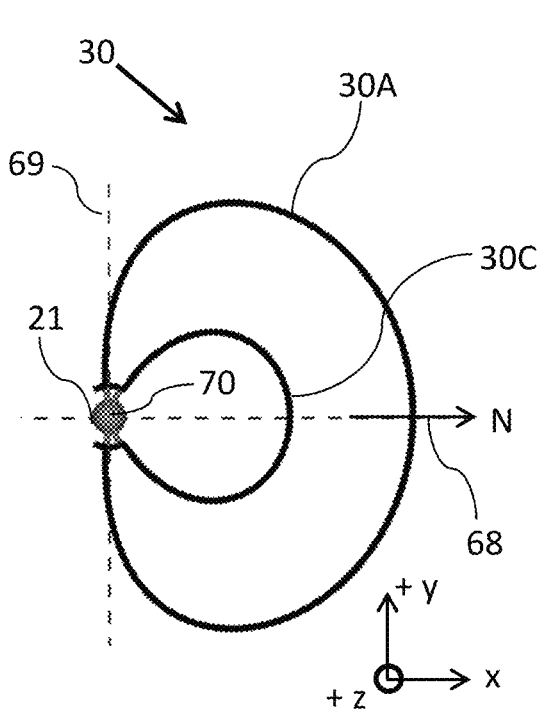
Figure 5D:
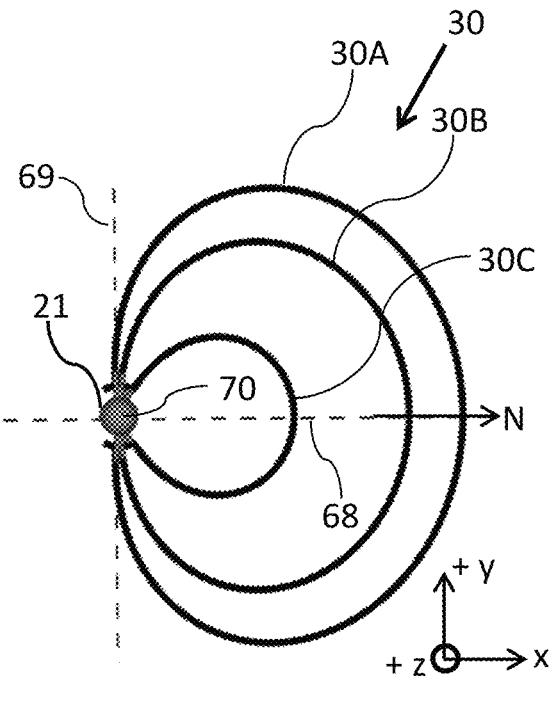

FIGS. 5C and 5D illustrate various embodiments of a positioning cam 30 from a plan view in the fixed frame of reference with the north-south x axis 68 and the east-west y axis 69. Other day paths may be selected, and other adjustment procedures may be adopted based on the application.

Figure 5E:
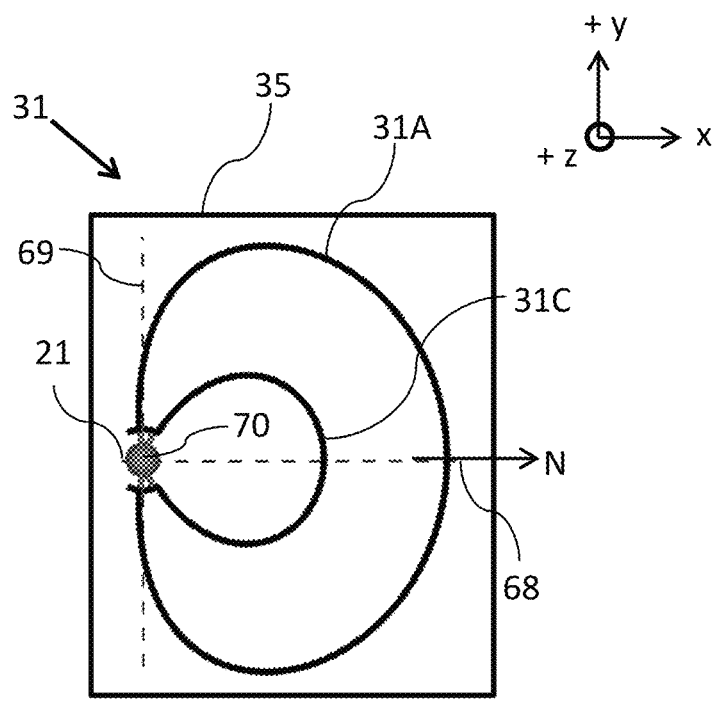
Figure 5F:
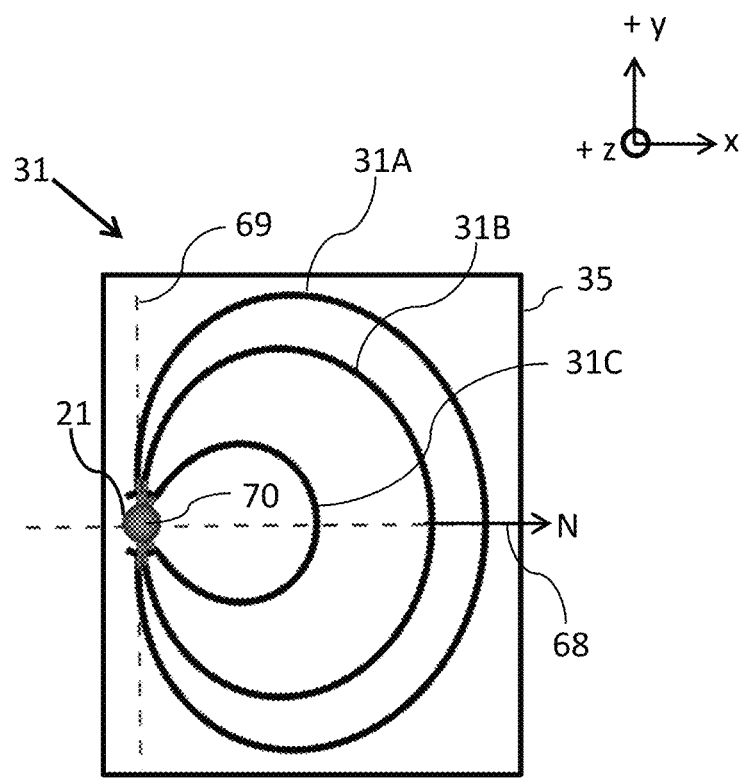

FIGS. 5E and 5F illustrate an additional embodiment of a positioning cam 31 from a plan view in the fixed frame of reference with the north-south x axis 68 and the east-west y axis 69. Positioning cam 31 is designed for the same days and latitude location as positioning cam 30. Day paths 31A, 31B, and 31C within positioning cam 31, however, are fashioned as guides cut from a sheet of material 35. Day paths 31A, 31B, and 31C perform the same function as other day paths described herein and are calculated using the same procedures. The sheet of material 35 may be made from sheet metal, wood, or any other appropriate material. Day paths 31A, 31B, and 31C may be cut from the sheet of material 35 through laser cutting, CNC machining, or any other appropriate means.

Figure 6A:
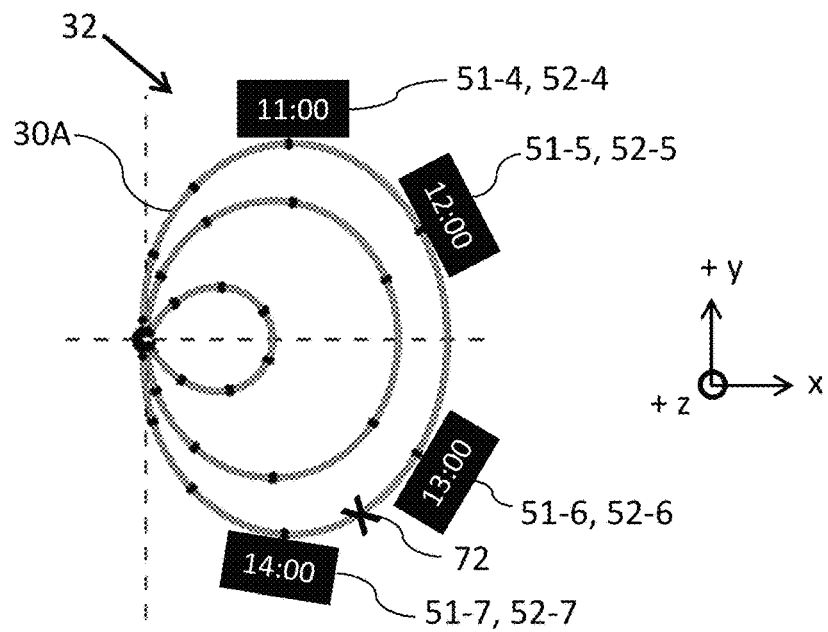
FIGS. 6A and 6B illustrate time points on a positioning cam of a mechanical solar tracker.
Figure 6B:
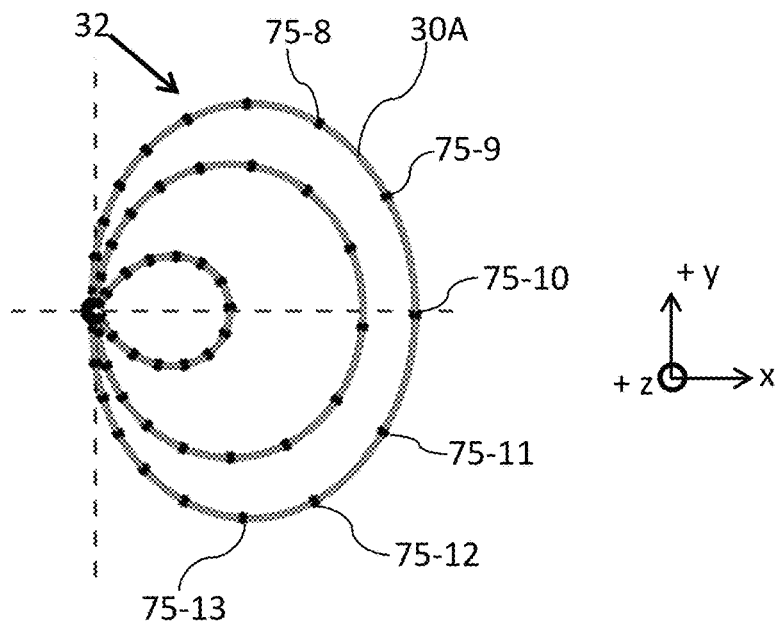

FIGS. 6A and 6B illustrate day paths 30A, 30B and 30C with time mark points 75-N denoted as small spheres within the day path. Each time mark point 75 may also include a time-of-day label 51 by which the operator may read the time. FIG. 6A illustrates four time-of-day labels 51-N, spaced at one-hour intervals. More or fewer time-of-day labels 51-N may be included in embodiments of mechanical solar tracker 100 or 102. For example, FIG. 6B illustrates six time mark points 75-N, spaced at 30 minute intervals. The correct azimuth angle by which to configure mechanical solar tracker 100 or 102 during operation may be determined manually through rotation until maximal shade is provided or maximal energy is collected by surface 10. Maximal energy collection may be reported to the operator through any kind of power measuring device. The correct angle at which to configure surface 10 may also be determined by the operator utilizing a sight 15, (illustrated in FIG. 1) that is positioned as a line of clear material or an opening within surface 10 that allows sunlight along sun direction vector to illuminate patio table 3 or the shaded object with a narrow line of sunlight. The operator may adjust the azimuth angle of cam follower 40 by rotation until the sun cast by sight 15 illuminates or is centered on the central pole 22.

The correct angle at which to configure surface 10 may also be determined by the operator based on the current time of the day. The operator may manually rotate surface 10 to the correct position by placing upper-cam follower 41 on the current day path 30A at a location estimated to lie between two adjacent time mark points 75-N or time of day labels 51-N based on the current time. For instance, if the time is 13:30 on July 4$^{th}$ and the current day path is 30A, the operator of mechanical solar tracker 100 may rotate the cam follower 40 such that upper-cam follower 41 rests on day path 30A between time-of-day label 51-6 and time-of-day label 51-7, at contact point 72 illustrated in FIG. 6A. The addition of time mark points 75-N and time-of-day labels 51-N to the cam day paths may also enable users to determine the approximate time. If surface 10 is positioned to maximally provide shade or solar energy, the time may be approximated by identifying the time-of-day labels 51-N that are nearby contact point 72. In this way, mechanical sun tracker 100 and 102 may act as a sun dial.

In another embodiment, upper-cam follower 41 may be configured to temporarily secure into place at the various time-mark points 75-N. Upper-cam follower 41 may be temporarily secured into place as it moves along a day path 30N by means of divots or small depressions 52-N (shown in FIG. 6A), or other similar securing mechanisms. Alternatively, upper-cam follower 41 may be temporarily secured into position by means of a securing mechanism installed in sleeve 24. The securing mechanism may temporarily secure the sleeve 24, cam-follower 40, or surface 10 for a specific time of the day until a new position is selected.

Figure 7A:
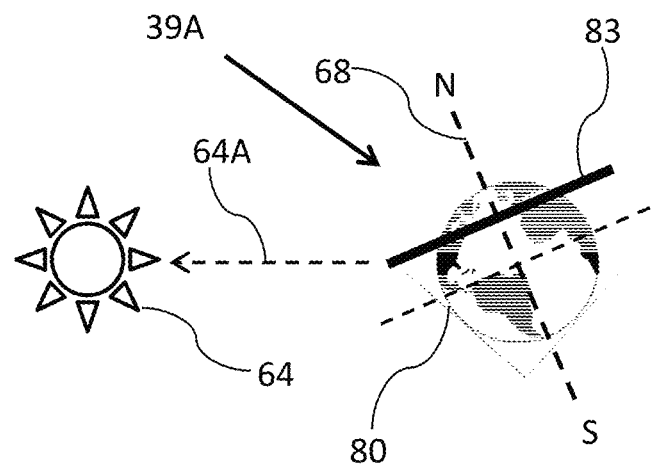
FIGS. 7A-7C illustrate labels for day paths of a positioning cam of a mechanical solar tracker.
Figure 7B:
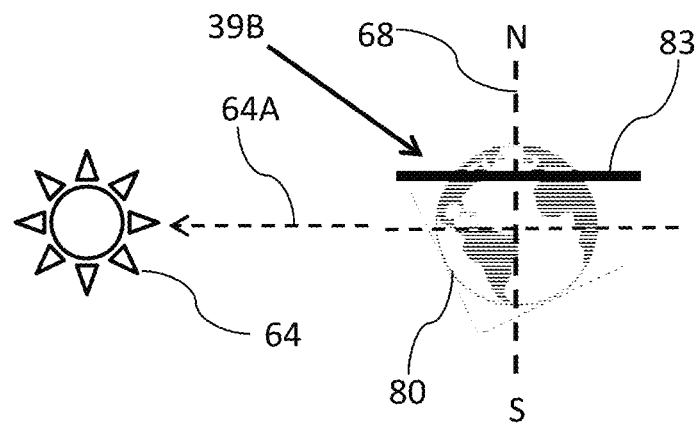
Figure 7C:
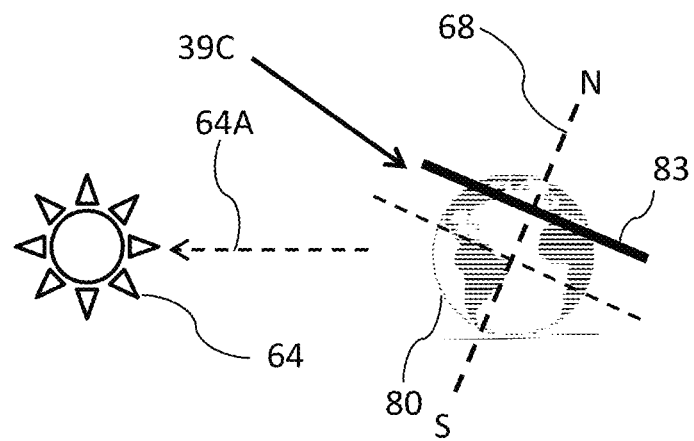

FIGS. 7A, 7B and 7C illustrate day-of-year labels 39A, 39B, or 39C, respectively, that may be included in the implementation of mechanical solar trackers 100 and 102. Each label 39A, 39B and 39C may include a graphic depiction of the Earth 80, a latitude indicator line 83 and the north-south x-axis 68. The north-south x-axis 68 is tilted in each label 39 calculated based on the date of the day path 30N and the tilt angle of the Earth 80 in its travel around the sun 64 determined through standard available references. The latitude indicator line 83 could be customized to the latitude of the deployment of the mechanical solar tracker 100 or 102, the same latitude used to calculate day paths 30N. In this example, day-of-year label 39A is designed for summer solstice in the northern hemisphere, day-of-year label 39B is designed spring or fall equinox, and day-of-year label 39C is designed for winter solstice in the northern hemisphere. In mechanical solar tracker 100, a day-of-year label 39-N for a date may be attached to a day path for the same date. For example, day path 30A illustrated in FIG. 1 and others, may be labeled with day-of-year label 39A. In FIGS. 7A, 7B and 7C, latitude indicator line 83 is customized a latitude of 42-degrees for Logan, Utah, USA.

Figure 8A:
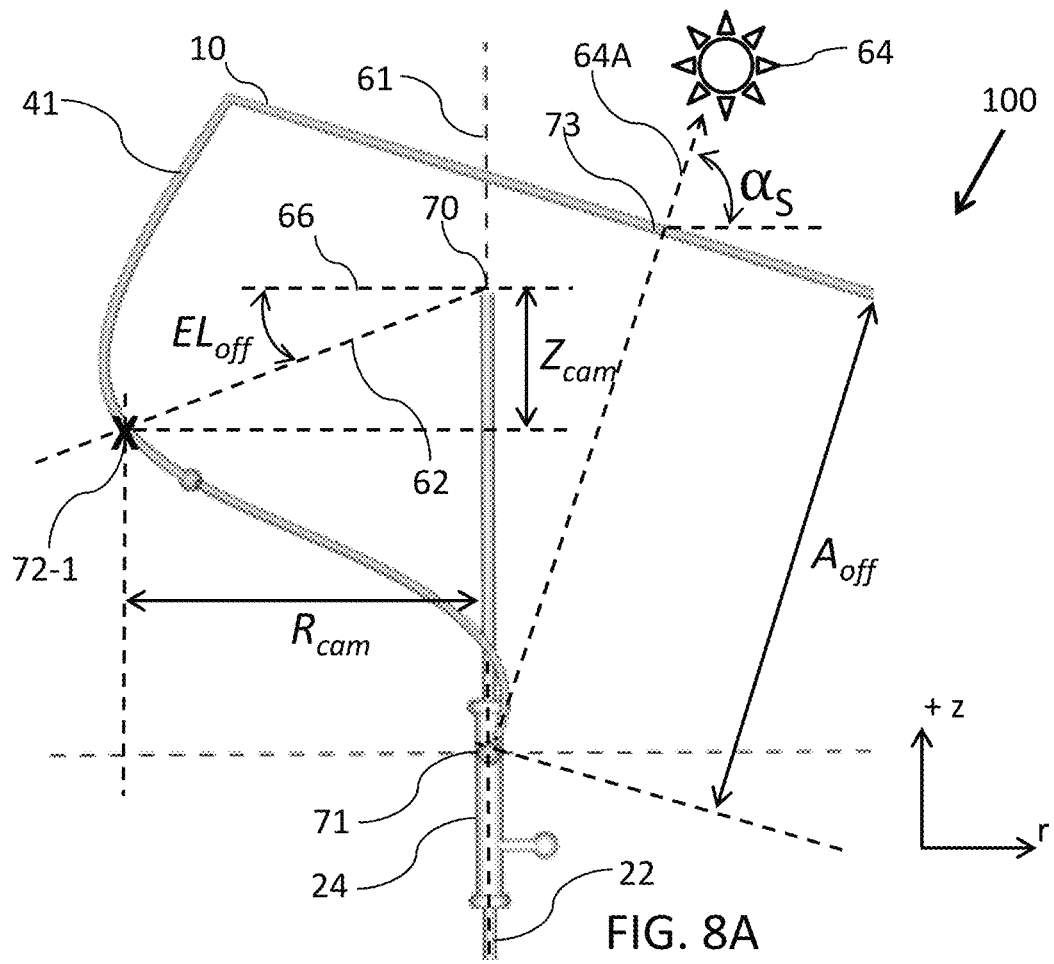
FIGS. 8A and 8B illustrate variables for configuring a positioning cam at a time of day for a mechanical solar tracker.
Figure 8B:
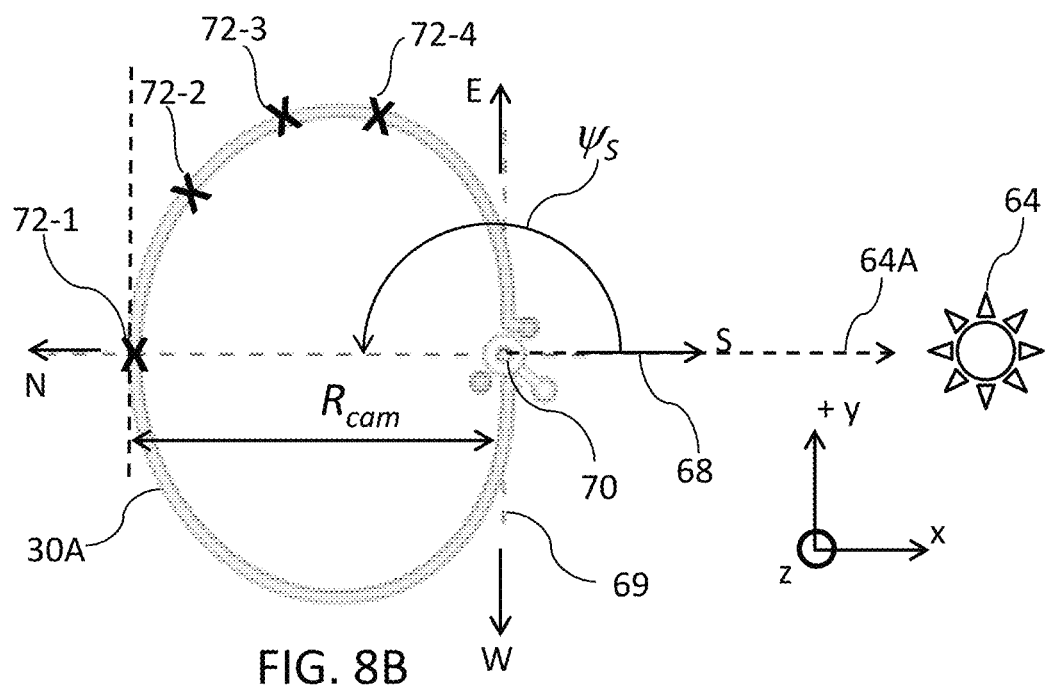

FIGS. 8A and 8B illustrate a cam-design procedure for calculating a positioning cam shape, such as positioning cam 30. In other words, FIGS. 8A and 8B demonstrate a method of constructing paths such as day paths 30A, 30B, or 30C. Without loss of generality, consider the construction of one day path given a fixed date, d. The path is constructed by sampling time t, that may be incremented in hours, minutes, or seconds. For each sample time, the contact point 72-N is calculated such that cam follower 40 will hold surface 10 positioned normal to sun direction vector 64A at time of day t and date d. For instance, with the date chosen as June 21$^{st}$ and with design parameters selected, the application of cam-design procedure will result in a set of contact points, 72-N, that when formed into a line will result in a day path, for example, day path 30A.

The determination of a single contact point 72-1 at a specific latitude lat, time t for the chosen date d, is a three-step procedure. In step one, the function Sun(lat, d, t) is called to determine the position of the sun at this latitude, date and time. The position of the sun is described as two angles $<\psi_S, \alpha_S>$, sun azimuth angle and sun elevation angle respectively. In step two, the coordinates of contact point 72-1 is calculated ignoring sun azimuth angle $\psi_S$ and only considering sun elevation angle $\alpha_S$. In step three, the contact point 72-1 calculated in step two is rotated about vertical axis 61 by sun azimuth angle $\psi_S$ to place the point in fixed space represented as x, y, z coordinates. FIG. 8A shows the calculation of contact point 72-1 during step two at 12:30 on summer solstice at Utah State University, Logan, Utah, USA. Surface 10 is positioned normal to sun direction vector 64A. In this instance, upper-cam follower 41 is leaning backwards close to its greatest extent at a maximum as because the local time is 12:30 on summer solstice. Central pole 22 and the sleeve 24 are also shown in FIG. 8A. FIG. 8B illustrates the result of step three when the contact point 72-1 has been rotated $\psi_S$ about vertical axis 61 from the z-r plane (in FIG. 8A) to the x-y plane (in FIG. 8B) to place contact point 72-1 in a fixed space in relation to the points of the compass at latitude lat and cartesian coordinates x, y, and z.

FIG. 8A illustrates variables for determining contact point 72-1 during step two that only considers sun elevation angle as, independent of sun azimuth angle $\psi_S$. The calculation of contact point 72 during step two is rotationally invariant about vertical axis 61 and so may be described in only two dimensions, z representing the height and r representing the radial offset from vertical axis 61. In this z-r plane, contact point 72-1 is represented as two coordinates $Z_{cam}$, the vertical distance relative to upper horizontal line 66, and $R_{cam}$ the horizontal distance from vertical axis 61.

To calculate the ideal position of contact point 72-1 on the day path 30A at a given time, date, and latitude, the first step is to rotate cam follower 40 and attached surface 10 about reference point 71 such that surface 10 is normal to sun direction vector 64A. Next, the contact point 72-1 is located where upper-cam follower 41 crosses cam design line 62. In the mathematical model, upper-cam follower 41 is represented as a polyline, defined mathematically as a sequence of points in the z-r plane, in which each two contiguous points in the sequence of points defines a straight line connecting the two points.

The procedure for determining a contact point 72-1 on the day path 30A involves determining whether a point exists in the mathematical model at which a single straight line, contained from two contiguous points within the mathematical model of upper-cam follower 41 intersects with cam design line 62. This may be determined in the mathematical model using a standard line intersection algorithm (see the Shamos-Hoey algorithm for instance). If no contact point 72-1 exists in the analysis as described above, the resulting theoretical cam path will be discontinuous, suggesting a redesign of upper-cam follower 41 or a modification to $EL_{off}$. The intersection point determined during step two is the contact point 72-1 in the z-r plane. Contact point 72-1 is defined by two coordinates $Z_{cam}$ and $R_{cam}$, where $Z_{cam}$ is the vertical distance from upper horizontal line 66 and the distance $R_{cam}$ is the horizontal offset distance from the vertical axis 61, as illustrated in FIG. 8A.

The resulting application of this procedure determines the contact point 72-1 in the z-r plane and concludes step two of cam-design procedure. FIG. 8B illustrates variables for determining contact point 72-1 during step three. Following step two, step three may proceed where contact point 72-1 is placed in the Cartesian coordinate system required for the physical implementation of positioning cam 30 as a component of mechanical solar tracker 100 or 102. Here, contact point 72-1 is rotated around vertical axis 61 by sun azimuth angle $\psi_S$. This final step places the contact point 72-1 in relation to the fixed reference frame, defined by the north-south x axis 68 and east-west y axis 69. The z-coordinate of the point in the fixed frame is set to $Z_{cam}$, determined in step two. In this case, the time being 12:30 at summer solstice (in Logan, Utah, USA), the contact point 72-1 illustrated in FIG. 8A in the z-r plane is rotated to be positioned directly to the north of cam center point 70 in FIG. 8B, thereby, through the cam-design procedure described herein, causing surface 10 to directly face the near noon-time sun 64 in both sun elevation angle as and sun azimuth angle $\psi_S$.

The cam-design procedure described above is repeated for each sample time during the date specified for this day path 30A. The contact points 72-N are collected into a list to form a polyline, which defines a day path 30A, as illustrated in FIG. 8B. In this example, although four potential contact points 72-1, 72-2, 72-3, and 72-4 are shown in FIG. 8B, a day path 30A may, in accordance with the present disclosure, be comprised of any number of potential contact points 72-N. Contact points that were calculated at specific times, such as every hour or every 30 minutes may be marked in the implementation of the positioning cam 30 or 31 as time mark points 75-N, illustrated in FIG. 6B and as time-of-day labels 51-N, illustrated in FIG. 6A.

The cam-design procedure may be repeated for each date specified for the positioning cam 30. In FIGS. 1, 2, 5B, 5D and 5F, three example dates are illustrated. These figures show the three dates as day paths 30A, 30B and 30C. The dates corresponding to the three day paths 30A, 30B and 30C may be chosen to optimize shade coverage to a given area or solar energy collection for a part of the year. The day paths 30A, 30B, or 30C may be calculated only for daylight hours and need not form a closed shape or closed path, unless the deployment location of the mechanical solar tracker 100 is within the Arctic Circle or the Antarctic Circle, where a contiguous path would be needed to follow the sun 64.

Figure 9A:
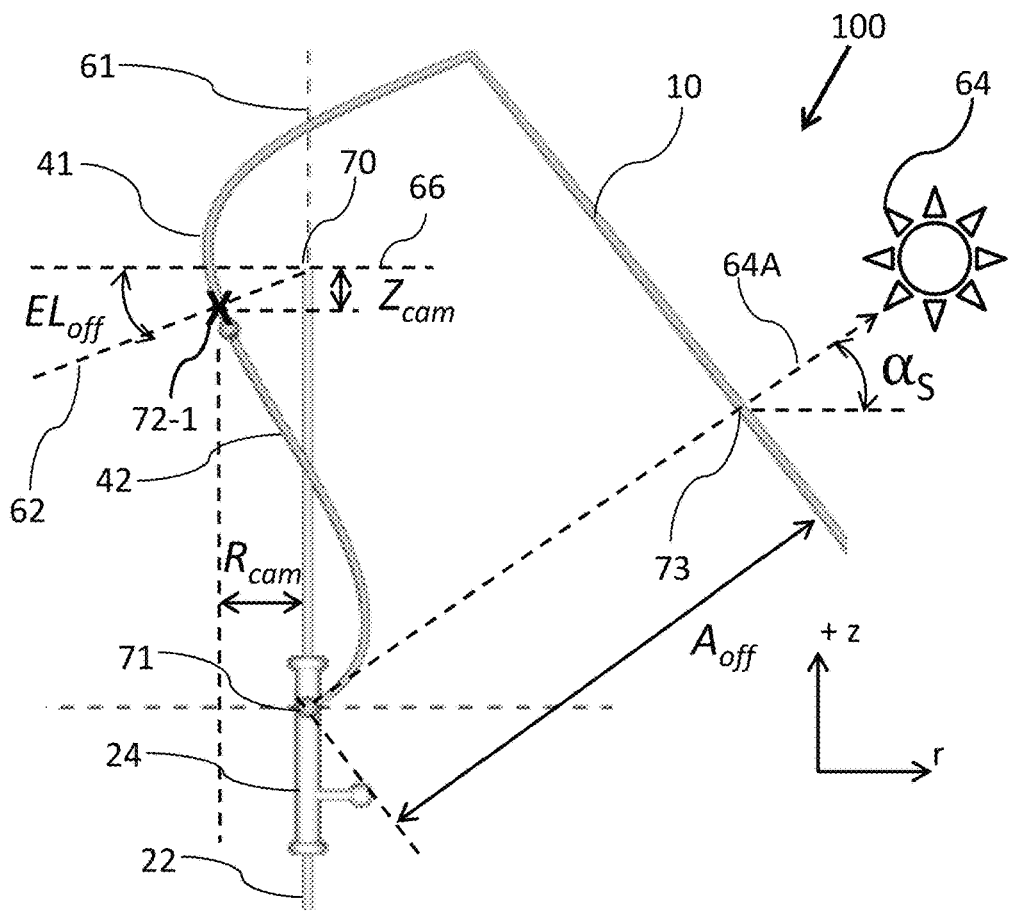
FIGS. 9A and 9B illustrate variables for configuring a positioning cam at another time of day for a mechanical solar tracker.
Figure 9B:
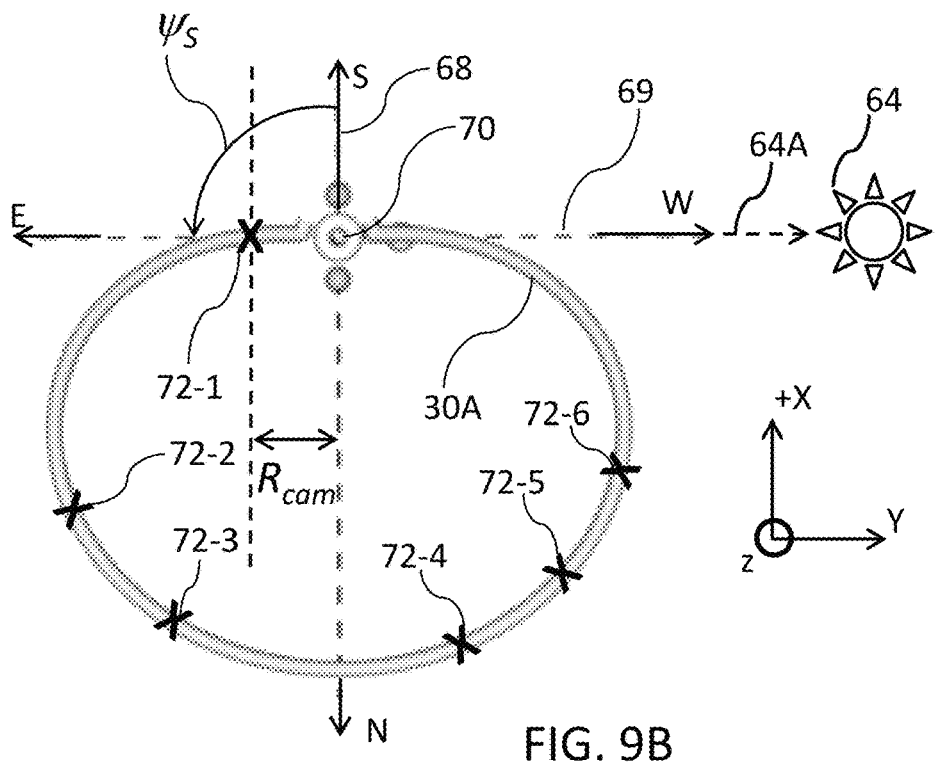

FIGS. 9A and 9B illustrate variables used in a cam-design procedure for a different time of the day and subsequent sun azimuth angle $\psi_S$ and sun elevation angle $\alpha_S$. FIG. 9A shows a view in the z-r plane at 19:30 during the summer solstice at Utah State University, Logan, Utah, USA. This view is independent of the azimuth angle. Surface 10 is positioned normal to sun direction vector 64A by a sun elevation angle $\alpha_S$ rotation of cam follower 40 about reference point 71. Upper-cam follower 41 positions surface 10 at a lower sun elevation angle $\alpha_S$ than that illustrated in FIG. 8A because the position of sun 64 is lower in the sky at 19:30 than it is at 12:30. The resulting application of step two of cam-design procedure determines the contact point 72-1, illustrated in FIG. 9A, representing a distance $Z_{cam}$ from cam center point 70 and a distance $R_{cam}$ from central pole 22.

Upon the completion of step two, the coordinates in the z-r plane are placed in the Cartesian coordinate system required for the physical implementation of positioning cam 30 as a component of mechanical solar tracker 100. Here, contact point 72-1 is rotated with respect to the sun azimuth angle $\psi_S$ calculated during step one and illustrated in FIG. 9B. This final step places the contact point 72-1 in relation to the fixed reference frame (shown in FIG. 9B), defined by the north-south x axis 68 and the east-west y axis 69. The z-coordinate of the point in the fixed frame is set to $Z_{cam}$, determined in step two. In the illustrated case, since the time is 19:30 and the date is the summer solstice, the contact point 72-1 is rotated to be positioned directly to the east of cam center point 70, configuring surface 10 to directly face the setting sun 64 in the west. This contact point 72-1 may be contained within the polyline that defines a day path 30A, as illustrated in FIG. 9B. Although FIG. 9B identifies six potential contact points 72-N, a day path 30A may be comprised of any number of potential contact points 72-N.

Referring back to FIGS. 5A, 5B, 8A, and 8B, the above described cam design procedure employs cam design line 62, that restricts the day paths 30N to be contained within a surface created by azimuth rotation of cam design line 62 around point cam center point 70. This surface may be an upward sloping cone when $EL_{off}$ is positive, a flat surface when $EL_{off}$ is equal to zero, and a downward sloping cone when $EL_{off}$ is negative. To provide additional flexibility in the shape of the positioning cam 30, cam design line 62 may be replaced by a polyline, as described above with respect to other polylines. Such flexibility may allow designers to satisfy interference or other mechanical constraints and satisfy various aesthetic considerations. The only change needed to step two of the cam design procedure is at the operation where the contact point 72-1 is identified (illustrated in FIGS. 8A and 8B). The procedure that checks for an intersection point (that becomes contact point 72-1) between cam design line 62 and each straight line contained within the polyline representing upper-cam follower 41 is replaced as follows: The procedure now checks for an intersection point (that becomes contact point 72-1) by looping through each straight line contained within the polyline representing cam design line 62 and each straight line contained within the polyline representing upper-cam follower 41. If an intersection point is identified, it will become contact point 72-1.

Positioning cam 30 for mechanical solar tracker 100 or 102 has so far been designed to track the sun 64 as it moves through the sky for specific days of the year. The cam design procedure may also be applied to design positioning cams that configure surface 10 to translate through a sequence of specific azimuth and elevation configurations, independent of the position of the sun 64. The azimuth and elevation configuration sequence may be configured to position surface 10 to track an object, point a mirror, follow a predefined path or to smoothly place surface 10 at a target azimuth and elevation configuration. These target configurations could include, but are not limited to, positioning surface 10 horizontally to minimize wind resistance or vertically to avoid snow accumulation.

Figure 10:
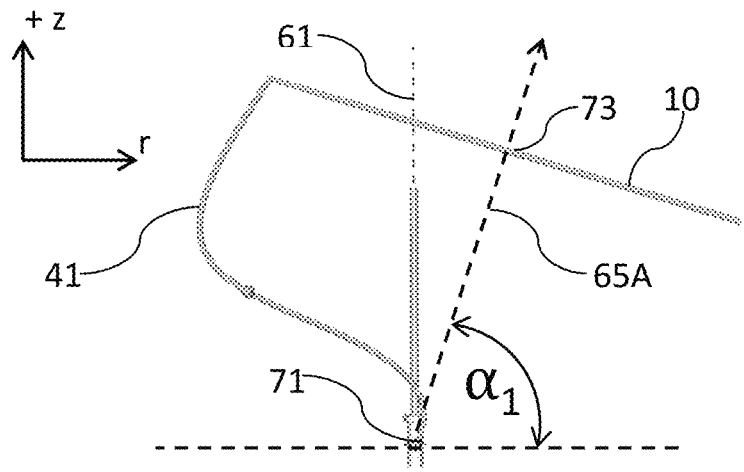
FIGS. 10A, 10B, and 10C illustrate possible configurations of a mechanical solar tracker.
Figure 10:
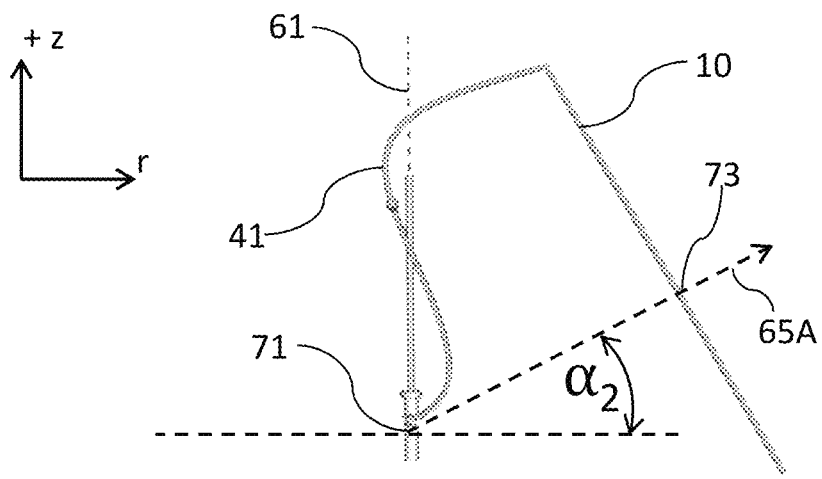
Figure 10:
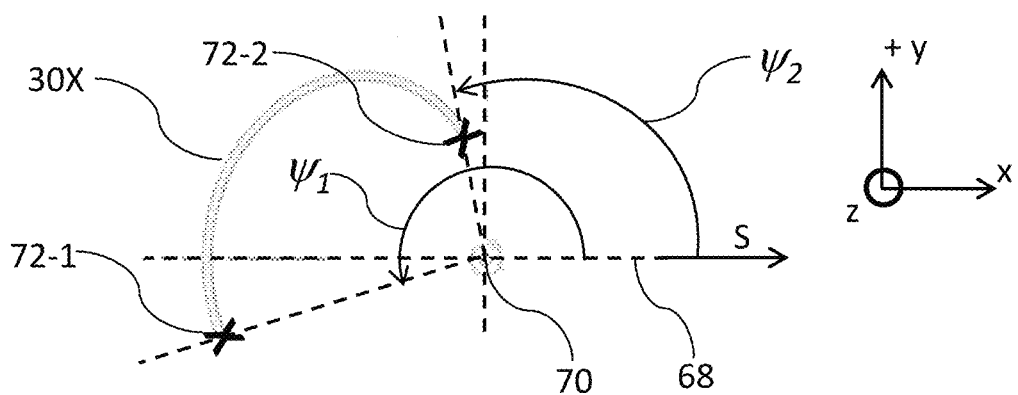

An example is provided in FIGS. 10A, 10B and 10C. FIG. 10A illustrates a possible beginning position in the z-r plane where surface 10 is held normal to target elevation vector 65A that is set at elevation angle $\alpha_1$ measured relative to a horizontal line passing through reference point 71. FIG. 10B illustrates a possible ending position in the z-r plane where surface 10 is held normal to target elevation vector 65A that is set at elevation angle $\alpha_2$ measured relative to the horizontal line that passes through reference point 71. In both FIG. 10A and FIG. 10B target elevation vector 65A is the vector that extends from reference point 71 to surface intersect point 73. Surface 10 is normal to target elevation vector 65A. FIG. 10C illustrates the starting azimuth angle at $\psi_1$ and the ending azimuth angle $\psi_2$ measured as a rotation in the x-y plane about reference point 71 relative to south, defined by the north-south x axis 68. In this example the desired trajectory in elevation angle and azimuth angle could be one that will smoothly transition the position of surface 10 at elevation angle $\alpha_1$ and azimuth angle $\psi_1$ to the position of surface 10 at elevation angle $\alpha_2$ and azimuth angle $\psi_2$. The sequence of intermediate surface 10 positions could be found by sampling the azimuth angle at regular intervals, for example in one-degree increments from $\psi_1$ to $\psi_2$.

The day path that implements this transition is illustrated as day path 30X in FIG. 10C that comprises a set of contact points 72-N that may be calculated using the previously described three-step cam-design procedure. In this case the desired configuration is not determined by the sun's position, so step one is skipped and the required sequence of specific configurations, each represented as two numerical values, one for elevation angle and one azimuth angle are passed as input angles to step two of the cam-design procedure and then to step three of the cam-design procedure. In FIG. 10C, contact point 72-1 is calculated from input elevation angle $\alpha_1$ and azimuth angle $\psi_1$ and contact point 72-2 is calculated from input elevation angle $\alpha_2$ and azimuth angle $\psi_2$. The application of this cam-design procedure results in a list of x, y, and z-coordinate contact points 72-N that define a polyline that may be realized in mechanical solar tracker 100 or 102. During operation, as the upper-cam follower 41 translates over day path 30X, surface 10 will implement the desired azimuth and elevation trajectory, starting at elevation angle $\alpha_1$ and azimuth angle $\psi_1$ and ending at elevation angle $\alpha_2$ and azimuth angle $\psi_2$. The polyline produced by this procedure may be implemented independently or conjoined with polylines designed to track the location of sun 64 during day-light hours.

In some embodiments, the day paths 30A, 30B, and 30C and upper-cam follower 41 may be physically constructed using a tube. In this case, the set of points that define the center path of the tubes implementing positioning cam 30 and upper-cam follower 41 may need to be adjusted relative to contact points 72-N to account for the tube diameters. This additional step is intended to adjust the physical design of the mechanical solar tracker 100 to account for the tube diameters while maintaining correct operation. Such adjustments in the positions of the tubes implementing day paths 30N and upper-cam follower 41 may be calculated using standard computer aided design tools.

FIGS. 11A-11H illustrates day paths 30N for three dates: solstice June 21st (30A-N), equinox March 20$^{th}$ (30C-N), and solstice December 21$^{st}$ (30E-N) at eight different locations on Earth. All the figures are to the same scale and are generated by the cam design procedure described herein. The mechanical dimensions of mechanical solar tracker 100 were kept the same for each location, including the shape of cam follower 40. The only change made was the latitude input to the cam design procedure.

Figure 11A:
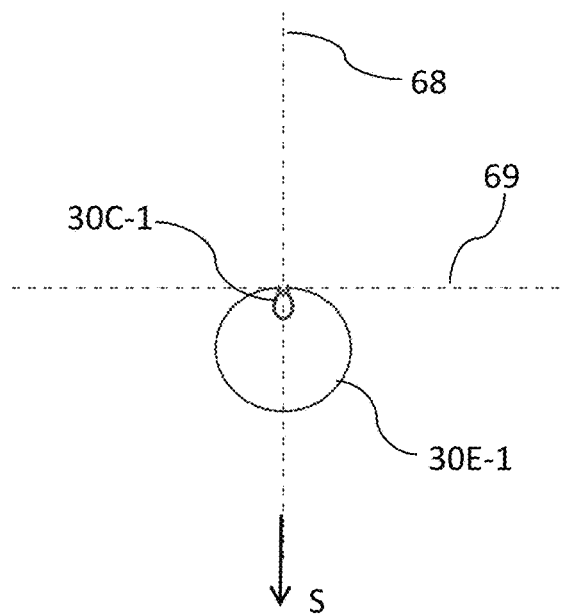
FIGS. 11A-11H illustrate various positioning cam paths for eight different locations on Earth.

FIG. 11A illustrates day paths 30A-1, 30C-1 and 30E-1 designed for Stanley, the capital of the Falkland Island, located at −51.69 degrees latitude.

Figure 11B:
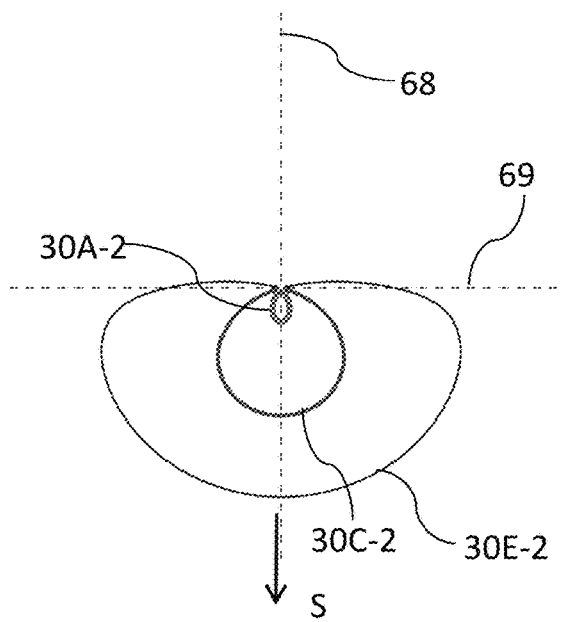

FIG. 11B illustrates day paths 30A-2, 30C-2 and 30E-2 for Brisbane, the capital of Queensland, Australia, located at −27.46 degrees latitude.

Figure 11C:
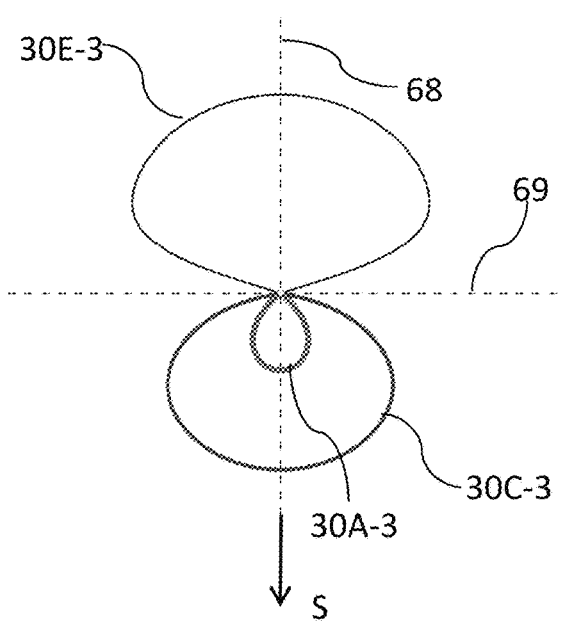

FIG. 11C illustrates day paths 30A-3, 30C-3 and 30E-3 for Lusaka, the capital of Zambia, located at −15.39 degrees latitude.

Figure 11D:
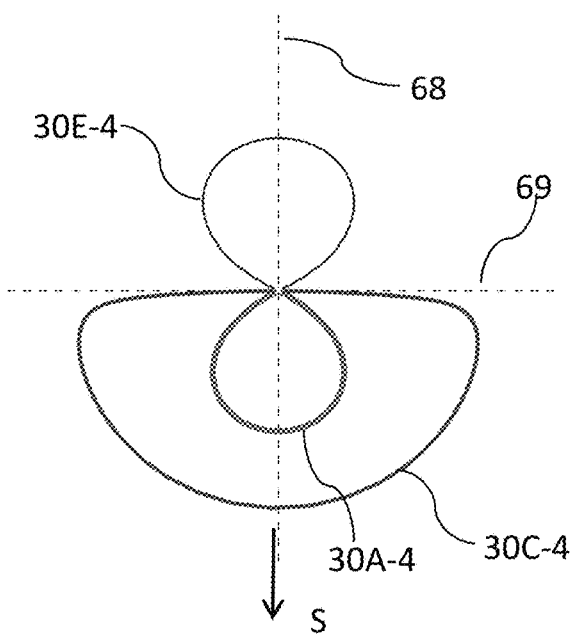

FIG. 11D illustrates day paths 30A-4, 30C-4 and 30E-4 for Nairobi, the capital of Kenya, located at −1.29 degrees latitude.

Figure 11E:
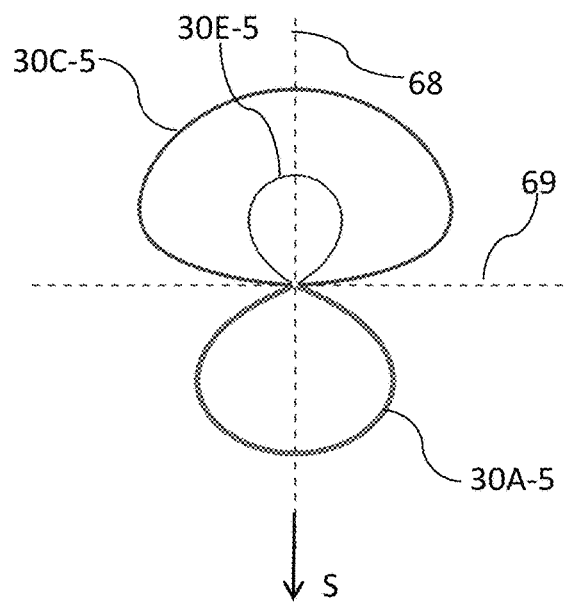

FIG. 11E illustrates day paths 30A-5, 30C-5 and 30E-5 for Georgetown, the capital of Guyana, located at +6.80 degrees latitude.

Figure 11F:
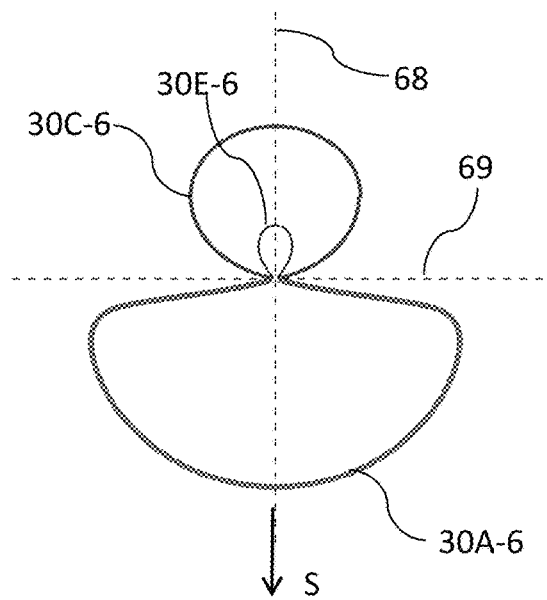

FIG. 11F illustrates day paths 30A-6, 30C-6 and 30E-6 for Honolulu, on the island of Oahu is capital of Hawaii, USA, and is located at +21.31 degrees latitude.

Figure 11G:
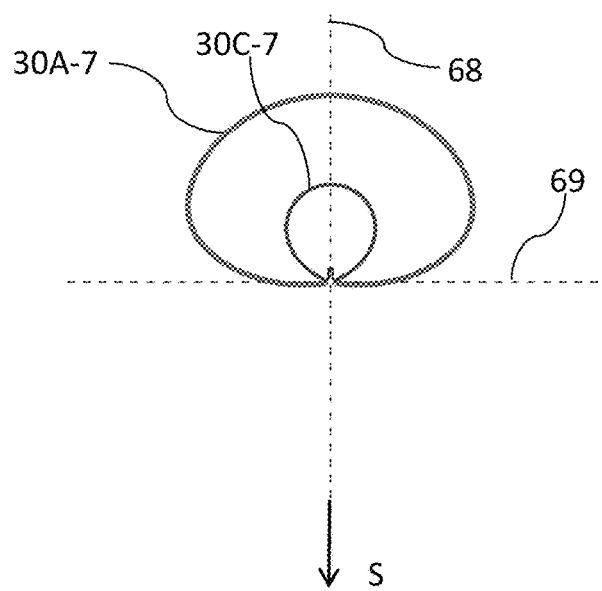

FIG. 11G illustrates day paths 30A-7, 30C-7 and 30E-7 for Phoenix, the capital of Arizona, USA, and is located at +33.45 degrees latitude.

Figure 11H:
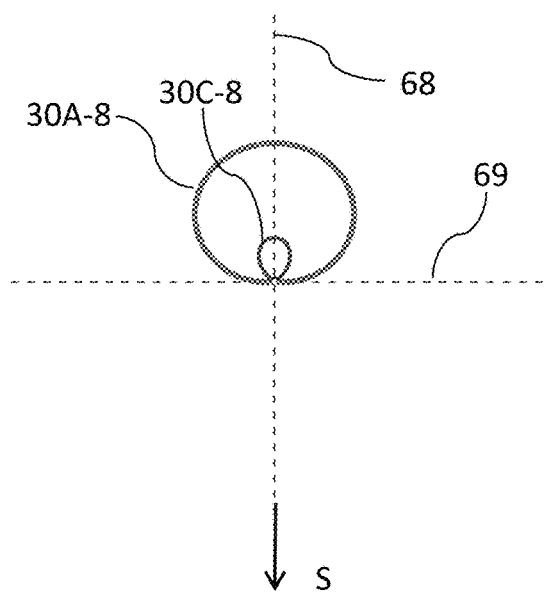

FIG. 11H illustrates day paths 30A-8, 30C-8 and 30E-8 for Budapest capital of Hungary, located at +47 0.50 degrees latitude.

In each calculation of day paths illustrated in FIGS. 11 A-H, the same design parameters $H_{off}$, $EL_{off}$, and $A_{off}$ illustrated in FIGS. 4A, 5A, 8A, and 9A, and the s-shape of the cam follower 40, were applied. The fact that the same design parameters and cam follower shape produce realizable mechanical configurations over a diverse set of locations on Earth demonstrates the universality of the cam-design procedure. In fact, mechanical solar tracker 100 realizations and the cam design procedure may be applied to deployments on the Moon based on Selenographic coordinates or Mars, based on planetocentric latitude and east longitude system.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The present invention may be embodied in other specific forms without departing from its spirit or essential characteristics. The described embodiments are to be considered in all respects only as illustrative, and not restrictive. All changes which come within the meaning and range of equivalency of the foregoing description are to be embraced within the scope of the invention.

I claim:

1. A mechanical solar tracker, comprising:
   a positioning cam comprising one or more paths, the one or more paths being configured as a function of a latitude location of the mechanical solar tracker;
   a sleeve coupled to an adjustment arm, the adjustment arm operable to rotate the sleeve about a vertical axis;
   a cam follower coupled to the sleeve, the cam follower configured to translate a selected path of the one or more paths as the sleeve rotates about the vertical axis; and
   a surface coupled to the cam follower and positionable offset laterally relative to the vertical axis;

wherein the selected path is configured such that as the sleeve rotates about the vertical axis, the cam follower maintains the surface normal to a vector defined by an azimuth angle and elevation angle, wherein the azimuth angle is a sun azimuth angle and the elevation angle is a sun elevation angle as the sun moves across the sky over a period of time.

2. The mechanical solar tracker of claim 1, wherein:
each path of the one or more paths is defined as an array of x, y, and z surface points, the surface points being a function of an azimuth angle and an elevation angle of the sun with respect to the surface, wherein:
x is a horizontal distance extending from a center point of the positioning cam in a first direction;
y is a vertical distance extending from the center point of the positioning cam in a second direction being perpendicular to the first direction; and
z is a distance extending from the center point of the positioning cam in a third direction being perpendicular to the first direction and to the second direction.

3. The mechanical solar tracker of claim 1, wherein each of the one or more paths is configured based on one of a number of dates.

4. The mechanical solar tracker of claim 1, wherein the selected path is the path corresponding to a first date of the number of dates, the first date of the number of dates being the closest in proximity to a current date out of the number of dates.

5. The mechanical solar tracker of claim 1, wherein the cam follower is configured such that it does not interfere with a given region, and wherein the given region is located beneath the surface and centered around a given point on the vertical axis.

6. The mechanical solar tracker of claim 1, wherein the cam follower comprises an upper portion coupled to the surface and a lower portion coupled to the sleeve.

7. The mechanical solar tracker of claim 6, further comprising a central pole aligned with the vertical axis, wherein the sleeve is concentric to the central pole.

8. The mechanical solar tracker of claim 7, wherein the central pole secures the positioning cam to a foundation.

9. The mechanical solar tracker of claim 7, wherein the sleeve is coupled to the central pole through one or more swiveling members that allow the sleeve to freely rotate around the central pole.

10. The mechanical solar tracker of claim 6, wherein the lower portion is configured to allow the central pole to pass through the lower portion.

11. The mechanical solar tracker of claim 1, wherein the azimuth angle and the elevation angle are configured to position the surface to track an object, point a mirror, follow a predefined path or to smoothly place the surface at a target azimuth and elevation configuration.

12. The mechanical solar tracker of claim 1, wherein the surface comprises a device suitable for at least one of the following:
providing shade from the sun; or
collecting solar energy.

13. The mechanical solar tracker of claim 1, wherein the surface comprises at least two surfaces, each of the surfaces being distinct surfaces mechanically coupled to move together.

14. The mechanical solar tracker of claim 1, wherein the sleeve and cam follower are configured to:
rotate circumferentially from east to west around the vertical axis during daylight; and
rotate circumferentially from west to east around the vertical axis during night-time and position, by dawn, the surface normal to the vector extending from the sun to the given point on the vertical axis.

15. The mechanical solar tracker of claim 1, wherein each of the one or more paths is a closed path.

16. A mechanical solar tracker, comprising:
a positioning cam comprising one or more paths, the one or more paths being configured as a function of a latitude location of the mechanical solar tracker;
a sleeve coupled to an adjustment arm, the adjustment arm operable to rotate the sleeve about a vertical axis;
a cam follower coupled to the sleeve, the cam follower configured to translate a selected path of the one or more paths as the sleeve rotates about the vertical axis, at least one of the cam follower and positioning cam being positioned vertically above the sleeve; and
a collector coupled to the cam follower;
wherein the selected path is configured such that as the sleeve rotates about the vertical axis, the cam follower optimizes the amount of solar energy collected by the collector by tracing the selected path as the sun moves across the sky over a period of time.

17. The mechanical solar tracker of claim 16, wherein the cam follower comprises an upper portion coupled to the surface and a lower portion coupled to the sleeve.

18. A mechanical solar tracker, comprising:
a positioning cam comprising one or more paths, the one or more paths being configured as a function of a latitude location of the mechanical solar tracker;
a sleeve coupled to an adjustment arm, the adjustment arm operable to rotate the sleeve about a vertical axis;
a cam follower coupled to the sleeve, the cam follower configured to translate a selected path of the one or more paths as the sleeve rotates about the vertical axis, the cam follower extending vertically upward relative to the sleeve; and
a collector coupled to the cam follower;
wherein the selected path is configured such that as the sleeve rotates about the vertical axis, the cam follower optimizes the amount of solar energy collected by the collector by tracing the selected path as the sun moves across the sky over a period of time.

19. The mechanical solar tracker of claim 18, wherein:
each path of the one or more paths is defined as an array of x, y, and z surface points, the surface points being a function of an azimuth angle and an elevation angle of the sun with respect to the surface, wherein:
x is a horizontal distance extending from a center point of the positioning cam in a first direction;
y is a vertical distance extending from the center point of the positioning cam in a second direction being perpendicular to the first direction; and
z is a distance extending from the center point of the positioning cam in a third direction being perpendicular to the first direction and to the second direction.

20. The mechanical solar tracker of claim 18, wherein the selected path is the path corresponding to a first date of the number of dates, the first date of the number of dates being the closest in proximity to a current date out of the number of dates.

* * * * *